(12) United States Patent
Bartsch et al.

(10) Patent No.: US 6,459,955 B1
(45) Date of Patent: Oct. 1, 2002

(54) HOME CLEANING ROBOT

(75) Inventors: Eric Richard Bartsch, Cincinnati; Charles William Fisher, Loveland; Paul Amaat France, West Chester; James Frederick Kirkpatrick, Milford; Gary Gordon Heaton; Thomas Charles Hortel, both of Cincinnati; Arseni Velerevich Radomyselski, Hamilton, all of OH (US); James Randy Stigall, Hebron, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/715,307

(22) Filed: Nov. 17, 2000

Related U.S. Application Data

(60) Provisional application No. 60/166,232, filed on Nov. 18, 1999.

(51) Int. Cl.[7] .............................................. G06F 19/00
(52) U.S. Cl. ...................... 700/245; 700/247; 700/256; 700/258; 700/259; 318/568.11; 318/568.12; 318/568.16; 318/587; 342/457; 342/418
(58) Field of Search ................................. 700/245, 247, 700/256, 259, 79, 83, 258; 318/587, 568.11, 568.16, 568.12; 701/22, 23, 25, 24, 206, 207, 225, 300, 26, 28, 217, 223; 342/457, 418; 180/167, 169; 340/990, 991, 995; 215/319

(56) References Cited

U.S. PATENT DOCUMENTS

| | | |
|---|---|---|
| 367,420 A | 8/1887 | Luchs |
| 2,770,074 A | 11/1956 | Jones |
| 3,088,157 A | 5/1963 | Aguilar |
| 3,952,361 A | 4/1976 | Wilkins |
| 3,963,096 A | 6/1976 | Jones |
| 4,114,711 A | 9/1978 | Wilkins |
| 4,161,793 A | 7/1979 | Merchan |
| 4,306,329 A | 12/1981 | Yokoi |
| 4,515,235 A | 5/1985 | Yamamoto et al. |
| 4,674,048 A | 6/1987 | Okumura |
| 4,700,427 A | 10/1987 | Knepper |
| 4,702,718 A | 10/1987 | Yanase |
| 4,782,550 A | 11/1988 | Jacobs |
| 4,811,228 A * | 3/1989 | Hyyppa ..................... 180/169 |

(List continued on next page.)

FOREIGN PATENT DOCUMENTS

| | | |
|---|---|---|
| DE | 3536974 A1 | 4/1987 |
| EP | 0476023 B1 | 3/1992 |
| EP | 0786229 A2 | 7/1997 |
| FR | 2324047 | 4/1977 |
| JP | 99178764 A | 7/1999 |
| JP | 99178765 A | 7/1999 |
| WO | WO9702075 A1 | 1/1997 |
| WO | WO01/06905 A1 | 2/2001 |

OTHER PUBLICATIONS

Marrone et al., Cleanning assistant—A service robot designed for cleaning task, 2001, IEEE, pp. 1041–1046.*

(List continued on next page.)

Primary Examiner—William A. Cuchlinski, Jr.
Assistant Examiner—McDieunel Marc
(74) Attorney, Agent, or Firm—Larry L. Huston; Leonard L. Lewis

(57) ABSTRACT

An autonomously movable cleaning robot comprising a platform and motive force to autonomously move the robot on a substantially horizontal surface having boundaries. The robot further has a computer processing unit for storing, receiving and transmitting data, and a cleaning implement operatively associated with the robot. The robot receives input data from an external source. The external source may be physical manipulation of the robot, remote control, or by triangulation from at least three external transmitters.

9 Claims, 18 Drawing Sheets

U.S. PATENT DOCUMENTS

| | | | |
|---|---|---|---|
| 4,847,769 A | * | 7/1989 | Reeve .......................... 180/168 |
| 4,933,864 A | | 6/1990 | Evans, Jr. et al. |
| 4,962,453 A | * | 10/1990 | Pong et al. ................... 180/167 |
| 4,977,639 A | | 12/1990 | Takahashi et al. |
| 5,012,886 A | | 5/1991 | Jonas et al. |
| 5,051,906 A | * | 9/1991 | Evans et al. .................... 701/28 |
| 5,109,566 A | | 5/1992 | Kobayashi et al. |
| 5,111,401 A | * | 5/1992 | Everett et al. ............... 324/139 |
| 5,155,684 A | | 10/1992 | Burke et al. |
| 5,220,263 A | * | 6/1993 | Onishi et al. ................ 180/168 |
| 5,276,618 A | * | 1/1994 | Everett, Jr. .................. 180/167 |
| 5,279,672 A | | 1/1994 | Betker et al. |
| 5,293,955 A | | 3/1994 | Lee |
| 5,321,614 A | * | 6/1994 | Ashworth .................... 180/167 |
| 5,341,540 A | | 8/1994 | Soupert et al. |
| 5,440,216 A | | 8/1995 | Kim |
| 5,451,014 A | | 9/1995 | Dare et al. |
| 5,570,285 A | * | 10/1996 | Asaka et al. ................ 180/169 |
| 5,613,261 A | | 3/1997 | Kawakami et al. |
| 5,622,236 A | | 4/1997 | Azumi et al. |
| 5,636,402 A | | 6/1997 | Kubo et al. |
| 5,749,058 A | * | 5/1998 | Hashimoto ............. 318/568.11 |
| 5,787,545 A | | 8/1998 | Colens |
| 5,815,880 A | | 10/1998 | Nakanishi |
| 5,883,861 A | | 3/1999 | Moser et al. |
| 5,894,621 A | | 4/1999 | Kubo |
| 5,903,124 A | | 5/1999 | Kawakami |
| 5,904,196 A | | 5/1999 | Wickers |
| 5,917,442 A | | 6/1999 | Manoogian |
| 5,919,078 A | | 7/1999 | Cassidy |
| 5,940,927 A | | 8/1999 | Haegermarck et al. |
| 5,942,869 A | | 8/1999 | Katou et al. |
| 5,943,009 A | | 8/1999 | Abbott |
| 5,974,347 A | | 10/1999 | Nelson |
| 5,988,306 A | | 11/1999 | Ooishi |
| 5,995,884 A | * | 11/1999 | Allen et al. .................. 180/167 |
| 5,999,866 A | | 12/1999 | Kelly et al. |
| 6,076,025 A | | 6/2000 | Ueno et al. |
| 6,076,226 A | | 6/2000 | Reed |
| 6,119,057 A | | 9/2000 | Kawagoe |
| 6,338,013 B1 | * | 1/2002 | Ruffner ........................ 701/23 |

OTHER PUBLICATIONS

Jung et al., Range adn pose estimation for visual servoing, 1998, Internet/IEEE, pp. 1226–1229.*

Science News, Computer designs and makes robots, 2000, Internet, pp. 1–4.*

Spencer, Personal robots, 1999, Internet, pp. 1–4.*

Takahashi et al., Tension control of wire suspended mechanism and application to bathroom cleanning robot, 2000, Internet, p 143–147.*

M. Sekiguchi et al., "Behavior Control For A Mobile Robot By Multi–Hierarchical Neural Network", Proceedings of the International Conference on Robotics and Automation, Scottsdale, May 15–19, 1989, vol. 3, May 15, 1989, pp. 1578–1583, XP000044339, Institute of Electrical and Electronics Engineers.

A. Holenstein et al., "Collision Avoidance In A Behavior–Based Mobile Robot Design", Proceedings of the International Conference on Robotics and Automation, Sacramento, Apr. 9–11, 1991, vol. 1, No. Conf. 7, Apr. 9, 1991, pp. 898–903, XP000218429, Institute of Electrical and Electronics Engineers.

Fei Yue Wang et al., "A Petri–Net Coordination Model For An Intelligent Mobile Robot", IEEE Transactions On Systems, Man And Cybernetics, vol. 21, No. 4, Jul. 1, 1991, pp. 777–789, XP000263601.

R. Hinkel et al., "An Application For A Distributed Computer Architecture–Realtime Data Processing In An Autonomous Mobile Robot", International Conference On Distributed Computing Systems, San Jose, Jun. 13–17, 1988, pp. 410–417m XP000040240, Institute of Electrical And Electronics Engineers.

Radio Shack Product Catologue No. Dustbot 600–2556. 16 pictures of the Radio Shack Dustbot are enclosed.

* cited by examiner

492B : $(x+a)^2 + y^2 = r1^2$

492B : $(x-b)^2 + (y-c)^2 = r2^2$

496 : $x = \sqrt{r1^2 - a^2 - H^2 + (\frac{a-HK}{1+K^2})^2} - (\frac{a-HK}{1+K^2})$

HOME CLEANING ROBOT

This application claims benefit of provisional application No. 60/166,237 filed Nov. 18, 1999.

FIELD OF THE INVENTION

The present invention is directed to autonomous, microprocessor controlled home cleaning robots having useful functions. More specifically, the present invention relates to autonomous, mobile home cleaning robots having a low energy cleaning apparatus. Even more specifically, the present invention relates to autonomous, mobile home cleaning robots having a low energy cleaning apparatus and a capability of adaptively performing and being trained to perform useful chores.

BACKGROUND OF THE INVENTION

Toys have provided play value and entertainment to children when the child imagines the toys are capable of independent behavior. Microprocessor controlled toys have recently offered limited simulations of living behavior for the non-productive enjoyment of children including violence-oriented video games. Microprocessor based toys, until now, do not educate by engaging in useful task-oriented behaviors with the child. Ideally a toy should benefit the child by not only providing play value, but also transparently encourage creative, task-oriented behavior which benefits the child and reduces the workload of working families. This invention is directed toward that end.

Principles of toys can be adapted to useful home cleaning robots. A toy that serves that purpose would be capable of performing useful tasks, capable of easily being trained by the child to perform tasks, and would be adaptive in operation to account for less then ideal training. Further the toy should have the appearance of some real or imaginary thing consistent with the useful behavior the child and toy would be engaged in so that the child's interaction is with an emotionally engaging plaything. Once learned, the task-oriented behavior should be storable, transferable, and recallable.

Non-functional toys intended to encourage task-oriented behavior in children have traditionally approximated tools and appliances used to perform tasks. For example, U.S. Pat. No. 5,919,078 (Cassidy, issued Jul. 6, 1999) discloses a toy which has the appearance of a cyclone-type vacuum cleaner. However, it does not vacuum, learn, or adapt.

Toys are also known to the art, which while they do not perform useful functions, do have some level of behavioral response to their environment. Recent examples of such toys are "Electronic Furby" available from Tiger Electronics, Vernon Hills, Ill. and various "Actimates" interactive dolls from Microsoft Corp., Redmond Wash. These toys are not suitable for teaching children to perform useful tasks although some of the better toys may build intellectual skills in reading, writing, or math. They do not learn tasks nor are they substantially adaptive to their environment.

Toys are also known to the art which are programmable by some means but which do not respond to environmental changes. For example U.S. Pat. No. 4,702,718 (Yanase, issued Oct. 27, 1987) discloses a mobile toy wherein the toy responds optically to prerecorded, rotating disks.

Toys are known which are mobile and to a limited degree have some means to perform a useful function but which are not trainable or adaptive. An example is a Dustbot toy previously sold by Radio Shack/Tandy Corporation, Fort Worth, Tex., catalog number 60-2556 which was a motorized, mobile toy capable of lightly vacuuming crumbs from a table-top. The toy was not trainable or adaptive.

Expensive consumer robots primarily intended for entertainment are known. A recent example is a robotic entertainment dog called "Aibo" available briefly from the Sony Corporation at a cost two orders of magnitude beyond most toys. Various devices of this type including commercially available research robots have been promoted as home robots for many years without widespread commercial success. Typically they require complex user interactions including programming, are not designed to perform useful tasks and are too costly to serve as children's toys as opposed to prestigious adult entertainment devices.

Many industrial and military "robots" exist which are trainable or adaptively interact with their environment or both. This robotic art is not directed at toys or the home. It focuses exclusively on utility without regard to play value. U.S. Pat. No. 3,952,361 (Wilkins, issued Apr. 27, 1976) discloses the general principle of task training in a self-guided floor cleaner which is manually operated through a floor-cleaning task. The device is trained by recording pulse-driven wheel motor signals during the manual operation onto a tape recorder. The tape subsequently is played to generate motor-driving pulses for automated operation.

Other "training" means used in mobile commercial robots include making a digital image map of the ceiling during manual operation from an upward-focused, robot-mounted video camera as in U.S. Pat. No. 5,155,684 (Burke et al. Issued Oct. 13, 1992) which is hereby incorporated by reference; setting up external beacons for triangulation as in U.S. Pat. No. 5,974,347 (Nelson, issued Oct. 26, 1999) which is hereby incorporated by reference; or using combinations of directional cues present in the operating environment such as gravity, the earth's magnetic field (multi-axis magnetometers), inertial guidance systems, global positioning via satellite (GPS), and radar imaging as in the case of guided missiles. Examples of such missile guidance technologies include U.S. Pat. No. 5,451,014 (Dare et al. issued Sep. 19, 1995) disclosing an inertial guidance system not requiring initialization; U.S. Pat. No. 5,943,009 (Abbot, Aug. 24, 1999) disclosing a simple GPS guidance system; and U.S. Pat. No. 5,917,442 (Manoongian et al., issued Jun. 29, 1999) disclosing guidance means where the target is illuminated (by radar). Related in technology, but not purpose, is U.S. Pat. No. 5,883,861 (Moser et al., issued May 12, 1998) disclosing an electronic compass in a wristwatch. Although many of these guidance technologies have been reduced to compact solid-state devices, they have not, sans warheads, heretofore been adapted for use in educational toys.

There is an unfilled for home cleaning robots that use low energy cleaning techniques and thus make chores easier for the user.

SUMMARY OF THE INVENTION

The present invention relates to autonomous, mobile, microprocessor-controlled home cleaning robots provided with the means to perform useful functions and capable of learning and adaptively performing useful functions.

In one embodiment, the present invention is a mobile, microprocessor-controlled home cleaning robot. The robot comprises a platform, a motive force attached to the platform. This motive force moves the platform on a substantially horizontal surface. The robot also includes a computer processing unit capable of storing, receiving and transmitting data that is attached to said platform. The robot also includes at least one sensor attached to the platform, which is capable of detecting a change on the horizontal surface. The sensor provides input to the computer processing unit. The platform includes a cleaning implement operatively associated with the platform and a power source connected to the motive force and computer processing unit, whereby the computer processing unit directs horizontal movement of the platform based upon input data received from the at least one sensor.

In one embodiment the present invention is comprised of an autonomous, adaptive mobile home cleaning robot provided with a detachable or dischargeable electrostatic cleaning cloth.

In one embodiment the present invention is comprised of an autonomous, trainable, adaptive mobile home cleaning robot provided with a detachable or dischargeable electrostatic cleaning cloth.

BRIEF DESCRIPTION OF THE DRAWINGS

FIG. 8b is a block diagram of the image processor 118 of FIG. 8a;

FIGS. 9a and 9b illustrate an image plane of the ceiling vision system of FIG. 8a;

DETAILED DESCRIPTION OF THE INVENTION

Figure 1:
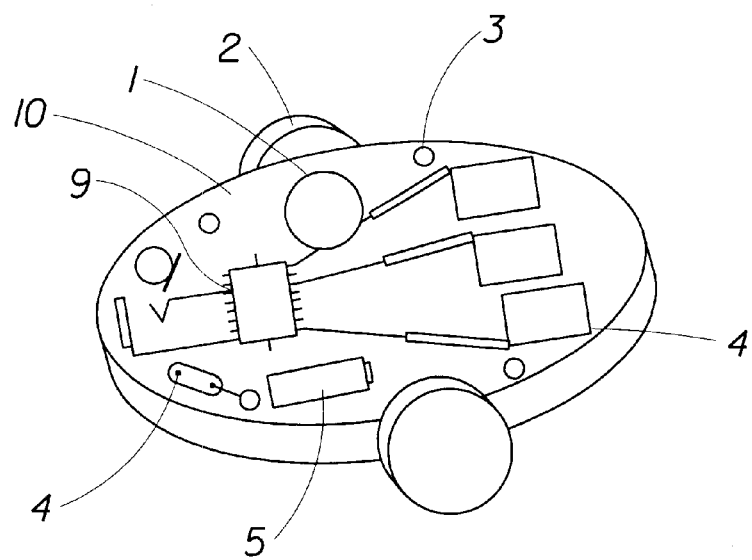
FIG. 1 is a perspective view of one embodiment of the platform of the robot of the present invention.

As used herein, the word "autonomous" is meant to describe the characteristic of independent mobility as opposed to active guidance by a human. For example a radio-controlled home cleaning robot relying on human operation of the remote control would not be autonomous. A similar home cleaning robot being instantly navigated by an onboard or off-board microprocessor and sensors without immediate human guidance would be autonomous.

As used herein the word "learning" is meant to describe mapping by being guided through a desired path or task manually and electronically recording the motions made to follow the path or perform the task. This may also be referred to as "training" the home cleaning robot. The recording can be of encoders on motors or wheels, recording an environment map of images or sonar responses, images, or various forms of beacons such as radio frequency sources, or passive RF beacons, or reflective or active optical beacons. Other mapping means can be used such as off board imaging or sensing of the mobile home cleaning robot in its environment while being guided. Learning in this sense can be accomplished by physically manipulating the home cleaning robot or by remotely controlling the home cleaning robot through a desired task, or by reinforcing desired behaviors as they occur by any communicative means. Programming such as the writing of non-variant software is not "learning" in the instant sense.

As used herein the word "adaptive" refers to storage of prior actions with respect to a desired goal or endpoint and changing the map of desired motor actions to optimize various behavior goals. For example, if a goal is to avoid light, and traveling along a first path does not reduce the level of incident light, that action would not be repeated but others would be tried successively until a direction or motion was found that resulted in reduced levels of light. In other words the behavior to a stimuli is not fixed, but varied until the desired goal is substantially achieved. Similar adaptive behaviors include, but are not limited to, tactile or sonar detection of obstacles that are discovered after programming and selecting actions which result in planning a path around the obstacle. It is to be understood that adaptive behavior is not limited to path selection but may also be applied to other output parameters such as light projection, audio output, speech patterns, and so on—dynamic selection of a behavior in accordance with the environment as found.

The primary emphasis of the instant invention is to provide an automated home cleaning robot having a low energy-cleaning device, which will free the user from such tasks. The present invention may optionally have play value which can be achieved through the inclusion of the inclusion of a personality by animalistic appearance, actions, sound, and the like distinguishes the instant invention from non-toys.

As used herein the phrase "play value" refers to the quality of home cleaning robots that provides pleasure, recreation, and training for user. One optional aspect of the instant invention is that it could provide play value to children (of all ages) while learning to perform useful tasks and teaching and watching their toys perform such tasks.

As used herein the word "platform" refers to an electro-mechanical device under microprocessor or computer control capable of some physical action such as, but not limited to, motion including but not limited to movement across a surface such as a horizontal surface, heating, spraying, moving air in response to sensor inputs such as sensed light, odor, contact, sound, radar, magnetic fields, electromagnetic fields, moisture, and the like. Typically a platform will be comprised of a microprocessor, a locomotion means, sensors, and a power source. A platform may be embodied in a single physical device or be distributed. For example a mobile platform may be guided by a remote computer or by wireless Internet access means to a remote computer. A data storage means may be on-board the mobile home cleaning robot or at a remote sight.

The general design principles of robot platforms are well known and described in the prior art. For applications, which require movement on a relatively flat, horizontal surface, the most suitable platform for the present invention is a wheeled or tracked locomotion form where the wheels may be selectively driven. The wheel or track alignment is substantially parallel. In two-wheeled, as opposed to tracked, platforms, one or more additional castered wheels or sphere-in-sockets may be used to support the body in addition to the independent drive wheels. A track-driven platform may be entirely supported by the tracks such as in the case of a bulldozer. Wheeled robotic platforms are available from Cybermotion, Salem, Va.; IS Robotics, Somerville, Mass.; Poulan, Robotic Solar Mower Dept., Shreveport, La.; and Nomadic Technologies Mountain View, Calif.

The robot of the present invention is "autonomously movable". "Autonomously movable", as used herein, is illustratively defined as the robot can move or translate within, preferably throughout, boundaries of a substantially horizontal surface that is desired to be cleaned without input from the user. "Movable", as used herein, means the movement or translation of the entire robot body, or in other words, the robot does not have a fixed base. The robot body can translate and optionally can rotate. In contrast, a robot that has a fixed base that rotates to accomplish tasks, such as sweep an arm of the robot, is not included within the meaning of the present invention.

The Home cleaning robot of the present invention is typically less than 10 kilograms, preferably less than 8 kilograms.

FIG. 1 illustrates one embodiment of the platform of the present invention provided with motor-driven wheels. The drive wheels 2, are separately and independently driven by an encoder-equipped motor 1 mounted on a common circuit board printed onto the platform, 10. The platform is provided with fastening points 3, for attachment of the cover by a fastening means not illustrated. Sensors 4 and 6, the power cell 5, and microprocessor control unit 9 are likewise mounted on the platform printed circuit board. In an alternative embodiment, a sound producing means 7, and an infrared port 8, for download or uploading instructions and remote operation of the platform is provided. It should be noted that tracks rather than wheels could be used when the application involves locomotion on other than a relatively smooth surface.

Figure 2:
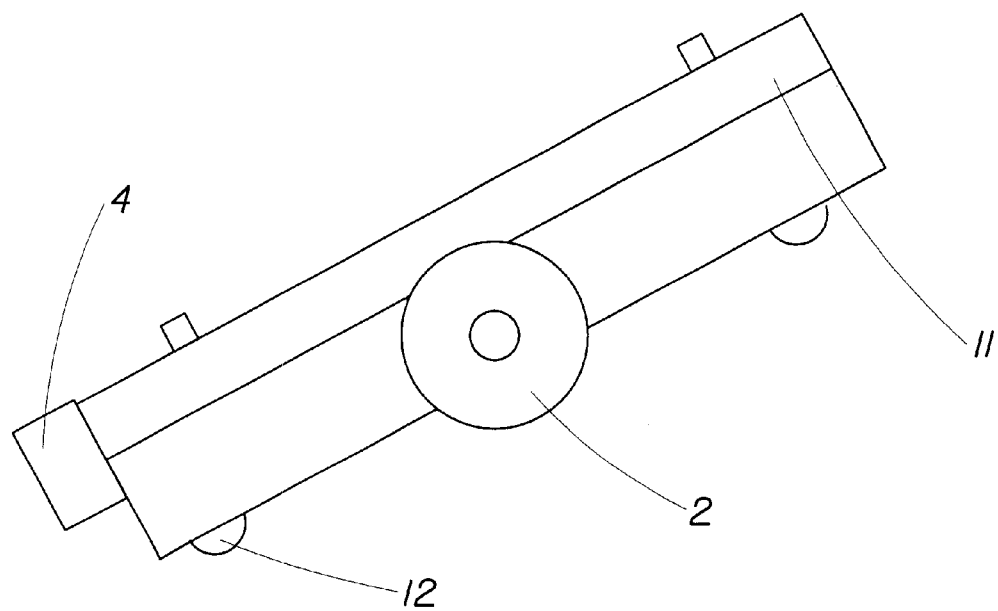
FIG. 2 is a side elevational view of the platform shown in FIG. 1.

FIG. 2 is a side view of the platform showing a front-mounted contact sensor 4, the printed circuit board 11 mounted on the platform structure, and a ball support means 12.

Figure 3:
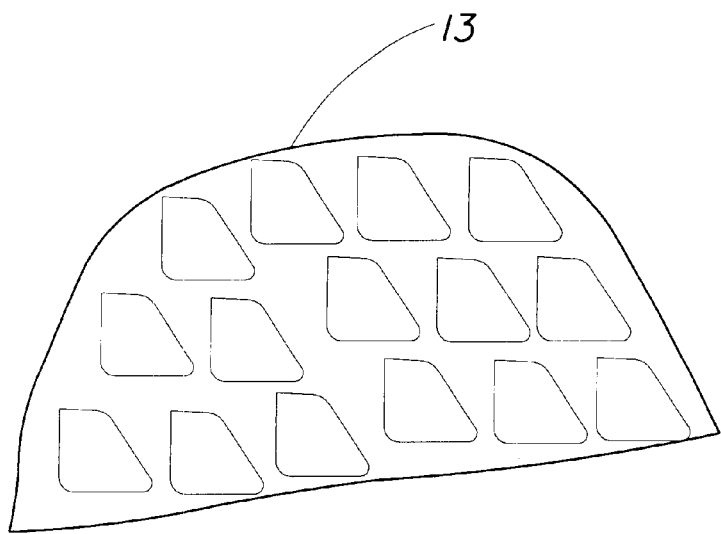
FIG. 3 is a side elevational view of one embodiment of a cover for the platform, wherein the cover is designed to look like a turtle.
Figure 4:
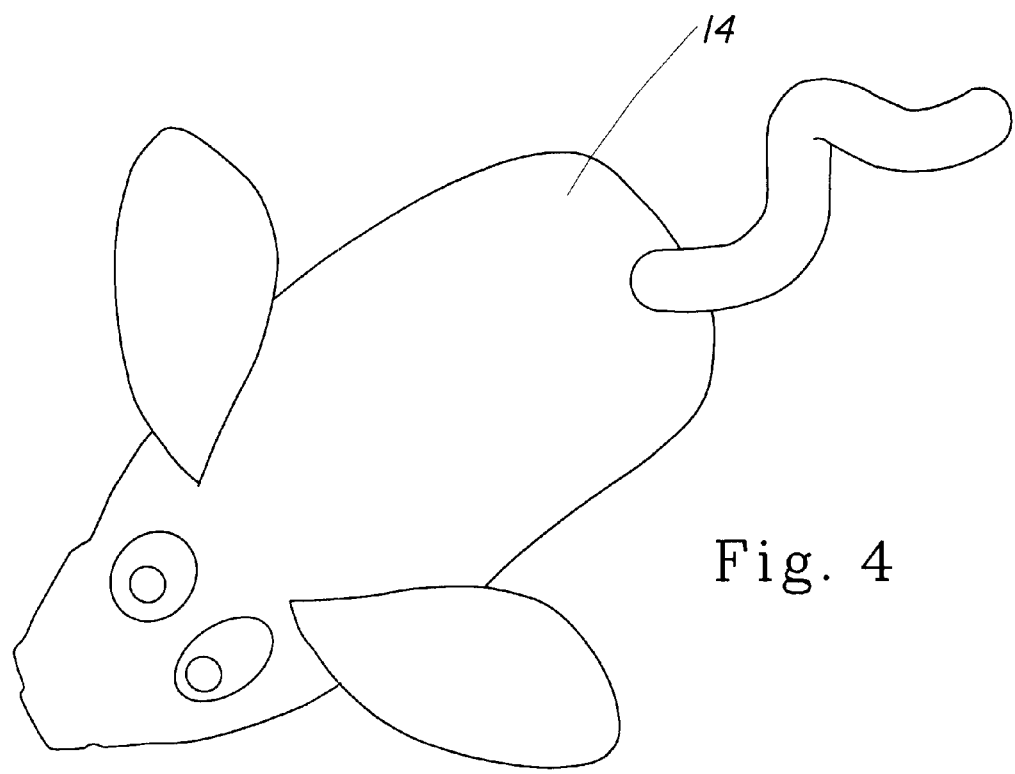
FIG. 4 is a top planar view of a further embodiment of a cover for the platform, wherein the cover is designed to look like a mouse.

FIGS. 3 and 4 illustrate typical covers that might be applied to the platform to provide an animalistic appearance. FIG. 3 illustrates a turtle shell cover, and FIG. 4 illustrates an animalistic cover, which may be fabricated from an electrostatic dusting material. The covers typically will extend beyond the wheels unless otherwise noted so that the wheels cannot be caught on vertical obstacles.

Other means of locomotion may be used without changing the scope of this invention. It is to be understood that a wheeled or tracked platform is to be applied to tasks that are to be performed on substantially level, horizontal surfaces such as floors, counter tops, lawns, gardens, roofs with low angles of inclination, and the like. The wheeled or tracked platform provides a motive force to move the platform on a substantially horizontal surface.

Generally, the robot is placed onto a substantially horizontal surface that is desired to be cleaned and then is powered on. Next, the robot moves randomly about the substantially horizontal surface performing a useful chore, such as cleaning with a nonwoven electrostatic cloth. Upon coming in contact with either a horizontal or vertical obstacle, the at least one sensor will trigger the platform to stop motion and then reorient itself and proceed with its task. This random motion robot does not include or require a navigation system.

As used herein the word "map" or "mapping" refers to a data structure stored in a computer memory means such as read and write memory, magnetic media, optical media, or the like which represents a task environment. This data may include but is not limited to a stored schedule of actions such as the number of encoder pulses per unit time from each of the locomotion motors, the compass direction per unit time, or relative position coordinates (e. g. triangulated position from sonar, light, or other beacon means, and other stored or calculated data against which real time sensor inputs can be compared to guide a mobile, computer operated platform or task performing components thereof such as manipulators, projectors, dispensing means, spray pumps, and so on. The map typically is initially built by a user manually leading the home cleaning robot through a set of desired actions or motions or the user doing so be remote direction. More data may be added adaptively during operation such as when obstacles are encountered. In a simple example a platform with two drive wheels may be manually pushed along a desired path. The output of optical, magnetic, or mechanical encoders on each drive wheel, a series of pulses, are recorded as a count per unit time for each encoder and stored in a memory means by the microprocessor under program control. The data storage means may be onboard the mobile home cleaning robot or located remotely via a wireless communications link or the Internet or some combination thereof.

One example of the microprocessor-based control and mapping system suitable for the guidance system of the present invention is shown and described in expired U.S. Pat. No. 4,674,048 (Okumura, issued Jun. 16, 1987), which is herein incorporated by reference. The guidance system comprises position identification means for sensing a distance traveled by the robot and a change in a direction of travel of the robot, calculating a position of the robot in two-dimensional coordinates in response to the sensed distance and the sensed change in direction, and generating a position signal representative of the robot position. Such a guidance system is known in the art. Obstruction sensor means senses an obstruction to generate an obstruction signal. The obstruction sensor means are mounted on a front end and both sides of the robot with respect to an intended direction of travel of the robot. Storage means stores a map consisting of a number of unit blocks, which are defined by parallel columns and parallel rows in the two-dimensional coordinates. Teaching means causes the robot to make a round along a boundary of a range to be traveled by the robot, so that the range is stored in the map of the storage means in response to the position signal output from the position identification means.

Figure 5:
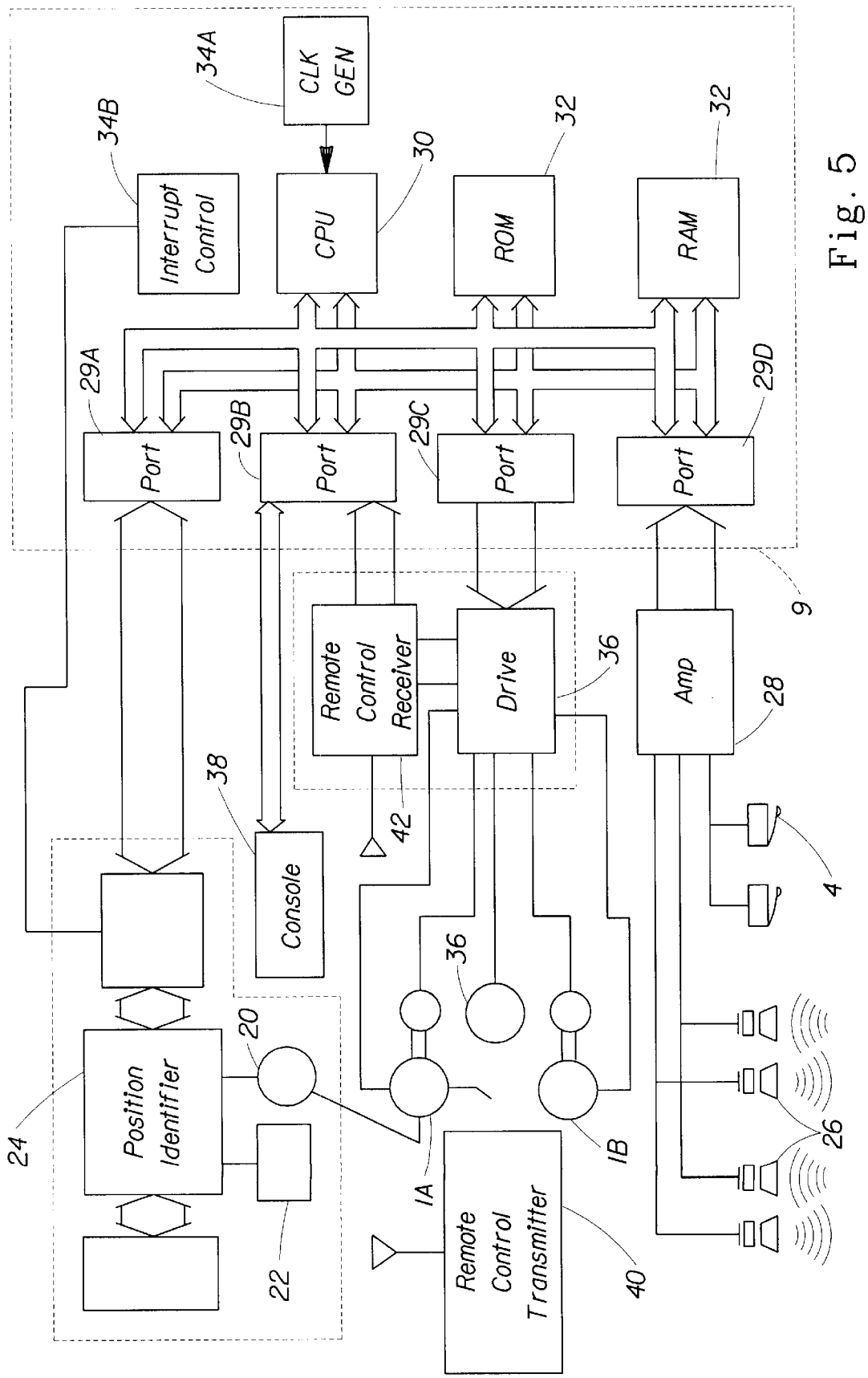
FIG. 5 is a block diagram of one embodiment of a robot control system of the present invention.

Referring to FIG. 5 of the drawing, a distance sensor 20 for producing a pulse signal which is proportional to a distance traveled by the mobile robot, e.g. number of rotations of drive wheels. A direction sensor 22, such as a gas rate gyro, is sensitive to a change in the traveling direction of the robot. The pulse signal output from the distance sensor 20 and the output of the direction sensor are supplied to position identification means 24. The position identification means 24 is constructed to measure a distance traveled by the robot by counting incoming pulses from the distance sensor 20 and to identify a moving direction of the robot from the output of the direction sensor 22, thereby identifying by operation instantaneous positions of the robot in two-dimensional coordinates for each unit travel distance. Obstruction sensors 26 are mounted on the front, opposite sides and back of the robot with respect to a direction of movement of the robot. Each of the obstruction sensors 26 is adapted to sense a wall, column or like obstruction and a distance to the obstruction by emitting a supersonic wave and receiving the reflection. Also mounted on the robot are touch sensors 4 which locate obstructions by mechanical contact therewith, independently of the obstruction sensors 26. The outputs of the sensors 4 and 26 are routed via an amplifier 28 and an input/output (I/O) port 29D to a control circuit 9, which comprises a microprocessor. Also, the output of the position identification means 24 is applied to the control circuit 9 via an I/O port 29A.

The control circuit 9 comprises a central operational circuitry (CPU) 30, and a storage 32 made up of a read only memory (ROM) and a random access memory (RAM). The control circuit 9 further comprises an oscillator 34A for generating clock pulses, and an interrupt controller 34B. As will be described, the CPU 30 delivers a drive signal to a drive circuit 36 via an I/O port 29C in order to reversibly control the rotation of drive motors (servo motors or stepping motors) 1A and 1B, which are respectively associated with right and left drive wheels of the robot. At the same time, the control 9 may optionally control the rotation of an optional drive motor 36 for cleaning sweepers, which are mounted on the robot. A control console 38 is accessible for selectively turning on and off a system power source, switching a running mode, setting a start position, adjusting a sensitivity of the direction sensor 22, etc. In order to teach the robot a boundary of a travel range assigned thereto, a command may be applied to the drive 36 by interruption with priority on a radio control basis. This is effected by a remote control transmit unit 40 and a receive unit 42. The outputs of the control console 38 and remote control receive unit 42 are routed also to the control circuit 9 via an I/O port 29B.

Figure 6:
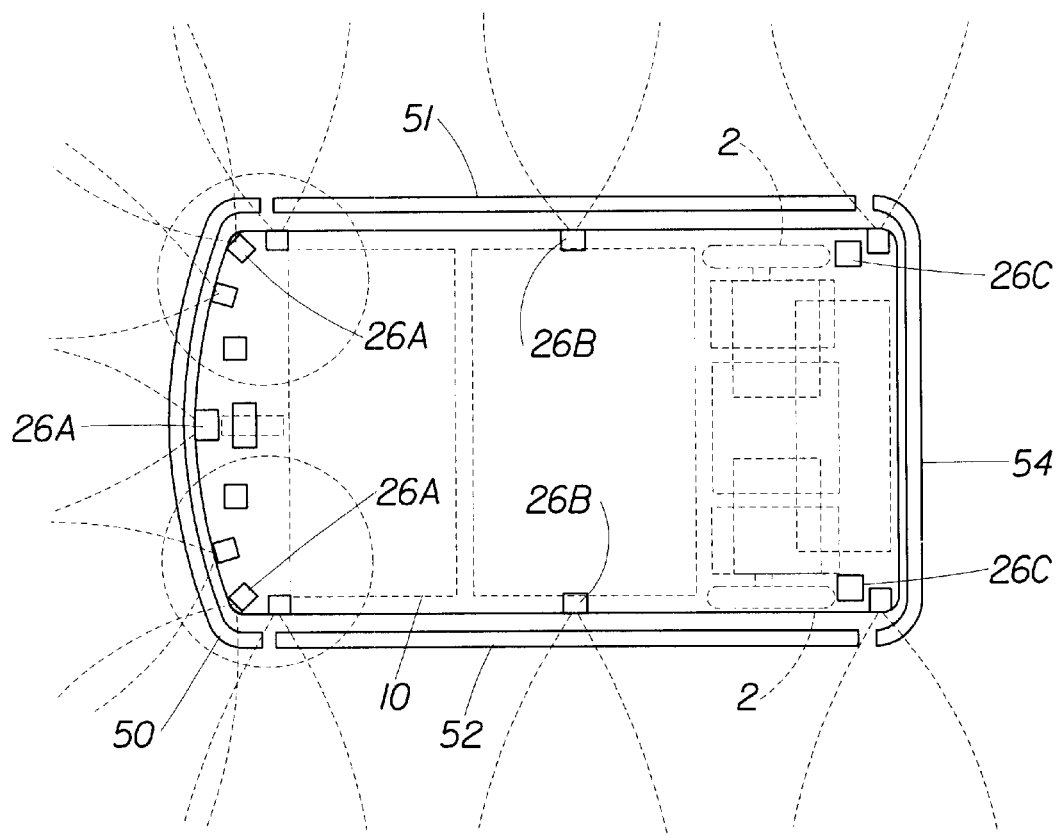
FIG. 6 is a schematic plan view of an alternative robot platform and control system in accordance with the present invention.

Referring to FIG. 6, one particular embodiment of the mobile robot is shown in a schematic plan view. As shown, the robot comprises a platform 10 which is substantially entirely surrounded by a front bumper 50, side bumpers 51 and 52, and a rear bumper 53, each carrying the touch sensor 4 therewith. An obstruction is sensed by the contact of any one of the bumpers 50–53 therewith.

Figure 7:
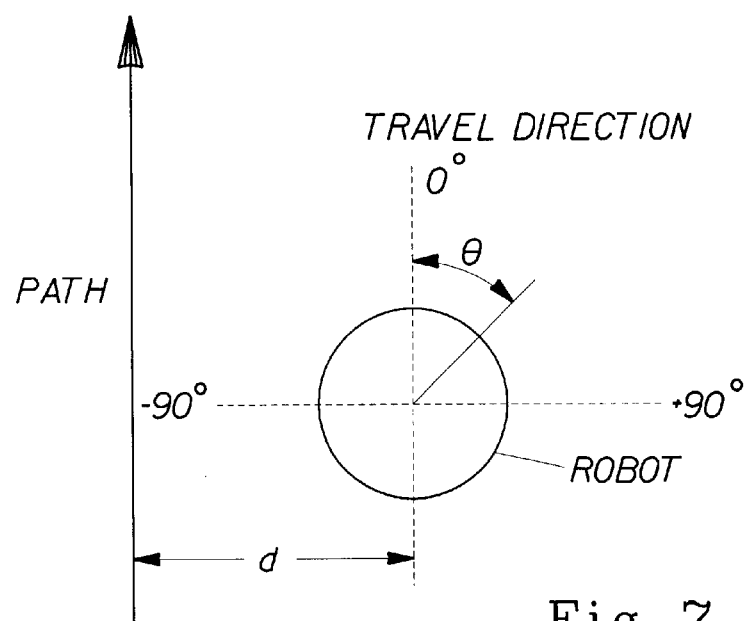
FIG. 7 is a diagram explanatory of a deviation of the robot from a predetermined straight path in accordance with the control system of FIG. 6.

As shown in FIG. 7, assume that the robot is deviated to the right from the reference path by a distance "d" with respect to the travelling direction of the robot, and that it is misoriented by an angle $\Theta$ relative to the reference path. Then, that the deviation of the robot is to the right of the reference path is determined. Also, whether the sign of d+tan $\Theta$ is positive or negative is determined by operation. Let it be assumed that d+tan $\Theta$ is either d+tan $\Theta \geqq 0$ or d+tan $\Theta + < 0$.

In the first-mentioned condition, d+tan $\Theta \geqq 0$, the distance d is large, or the angle $\Theta$ is relatively small, or the orientation of the robot lies in the positive angular range. Then, the rotation speed V of the left drive wheel is controlled to be $V = V_0 - (d + \tan \Theta)$ (where the minimum value of V is assumed to be $V_0$), while the rotation speed of the right drive wheel is kept at $V_0$, whereby the robot is caused to make a leftward turn or rotate leftwardly about an axis thereof.

The other condition, d+tan $\Theta < 0$ represents a situation in which the angle .theta. is negative and the robot is directed toward the path at a large angle. In this case, while the rotation of the left drive wheel is maintained the same, the rotation speed V of the right drive wheel is controlled to be $V = V_0 + (d + \tan \Theta.)$, thereby turning or rotating the robot to the right.

In this manner, the actual path of the robot is controlled to the reference path if dislocated therefrom, that is, the position of the robot is corrected.

The compensation effected for rightward deviation of the actual robot path from the reference path as described similarly applied to leftward deviation of the robot, except for the reversal of angles and that of the control over the right and left drive wheels.

Due to the use of a tan function as a compensation term for the angle $\Theta$, so long as MAX in the relation $-\text{MAX} < \tan \Theta < \text{MAX}$ is sufficiently large, there exists a position and an angle where d+tan $\Theta = 0$ holds, even if the deviation d from the path is substantial. At such a specific point, the right and left drive wheels of the robot are equal in velocity and they approach the path at an angle to the path which becomes closer to the right angle as the distance d increases and decreases with the decrease in the distance d. Stated another way, the orientation of the robot is compensated sharply when the distance d is large and the compensation is slowed down as the distance d becomes smaller. This insures smooth compensation. If desired, the term d may be multiplied by a positive constant "$\alpha$" and the term tan $\Theta$ by a positive constant $\beta$ so that any desired path compensation characteristic is established up to the point where $\alpha d + \beta \tan \Theta = 0$ holds, that is, the point where the robot advances straight with the right and left drive wheels running at an equal angle.

Teaching the robot a desired range of movement may be implemented by the supersonic wave sensors 4A, 4B and 4C and the touch sensors 5 which are mounted on the robot itself, instead of the remote control transmit and receive units. Some of the supersonic wave sensors 4A, 4B and 4C are capable of identifying short and medium ranges and the others, long ranges. Such self-teaching with the various sensors is optimum for cleaning, for example, the floor of a room which is surrounded by walls; the robot will make one round automatically along the walls of the room by sensing the walls with the sensors.

Another example of mapping suitable for use as a navigation system in the present invention includes mapping via imaging ceiling lights, which is known in the art. Such a system is shown and described in expired U.S. Pat. No. 4,933,864 (Evans et al., issued Jun. 12, 1990) and is herein incorporated by reference.

In such a mapping and navigation system, the robot microprocessor uses an imaged input to make a map of an environment, such as a kitchen, and determines the home cleaning robots position and orientation on that map from an image input, such as the ceiling lights in that room. In particular, the guidance system robot images light patterns on the ceiling. By extension, the camera could include the robot on a two dimensional surface.

Figure 8A:
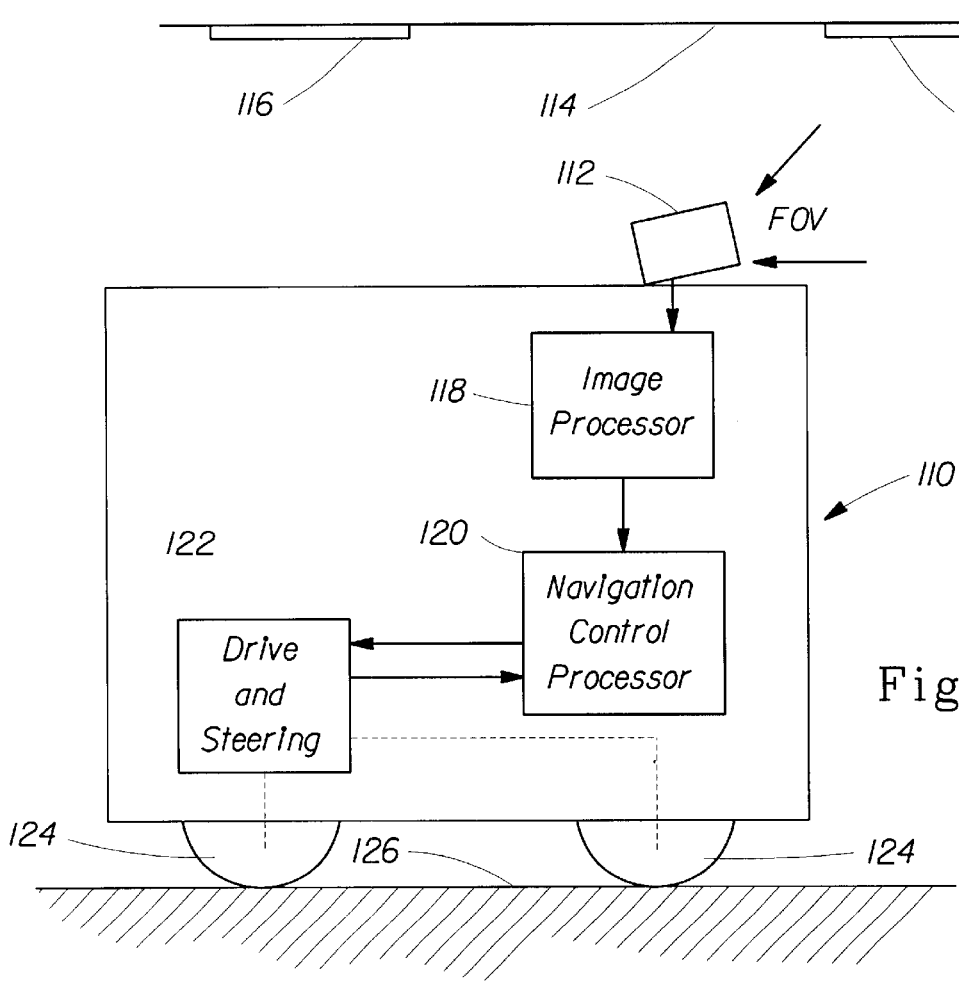
FIG. 8a is an illustrative block diagram showing a mobile robot, constructed and operated in accordance with one embodiment of the invention, which includes a camera having an upwardly pointing field of view for viewing a ceiling above the robot, the ceiling having a plurality of ceiling fixture light sources.
Figure 8B:
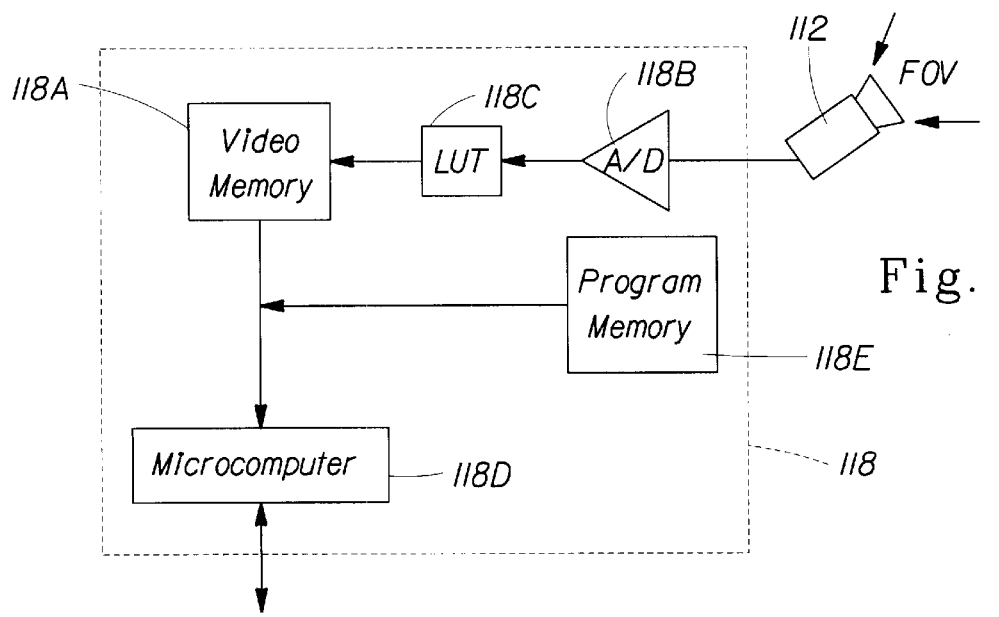

Referring now to FIG. 8a there is shown a side view of one embodiment of a mobile robot 110 comprising an electronic imaging device, such as a camera 112. In accordance with the invention this optical configuration is arranged to view a ceiling 114 having a plurality of light fixtures 116, the ceiling 114 being disposed above the desired path of the robot 110. The camera 112 preferably includes a CCD imaging device having a square or rectangular field of view (FOV) which is directed obliquely upward such that it images the ceiling 114 within the forward path of the robot 110. The camera 112 generates a plurality of pixels, individual ones of which have a value indicative of an intensity of radiation incident upon a corresponding surface area of the camera radiation sensing device. Robot 110 further comprises an image processor 118 which is coupled to the output of camera 112. Image processor 118, as shown in greater detail in FIG. 8b, comprises a video memory 118A which stores a representation of one video frame output of camera 112. An input to video memory 118A may be provided by an analog to digital (A/D) converter 118B which digitizes the analog output of camera 112. The digital output of A/D 118B may form an address input to a lookup table (LUT) 118C wherein pixel brightness values may be reassigned. The LUT 118C may also be employed for image thresholding and/or histogram correction. Image processor 118 further comprises an image processing device, such as a microcomputer 118D, which is coupled to the video memory 118A and which is operable for reading the stored video frame data therefrom. Image processor 118 further comprises memory 118E which includes memory for storing program instructions, constants and temporary data. The program data may be operable for performing calculations of the type which will be described in detail hereinafter. An output of image processor 118 which is expressive of position information relating to ceiling fixtures 116 within the FOV of camera 112 may be supplied, via an RS-232 or parallel data link, to a navigation control processor 120 which derives navigation data based upon the perceived image of the ceiling environment, particularly the orientation of ceiling light fixtures. This data may be employed to steer the robot down a hallway or to orient the robot within a coordinate system of a room or other enclosure having ceiling light fixtures. An output of navigation control processor 120 is supplied to a drive and steering control 122 which has outputs coupled to drive and steering wheels 124. The wheels 124 are in contact with a supporting surface 126 which is typically a floor. Navigation control processor 120 typically receives an output from the drive and steering control 122, the output being expressive of odometer readings which relate to the distance traveled by the robot 110. Navigation control processor 120 comprises a data processing device having associated memory and support circuitry. An enclosure is provided to contain the aforementioned apparatus and to provide protection therefore.

Figure 8C:
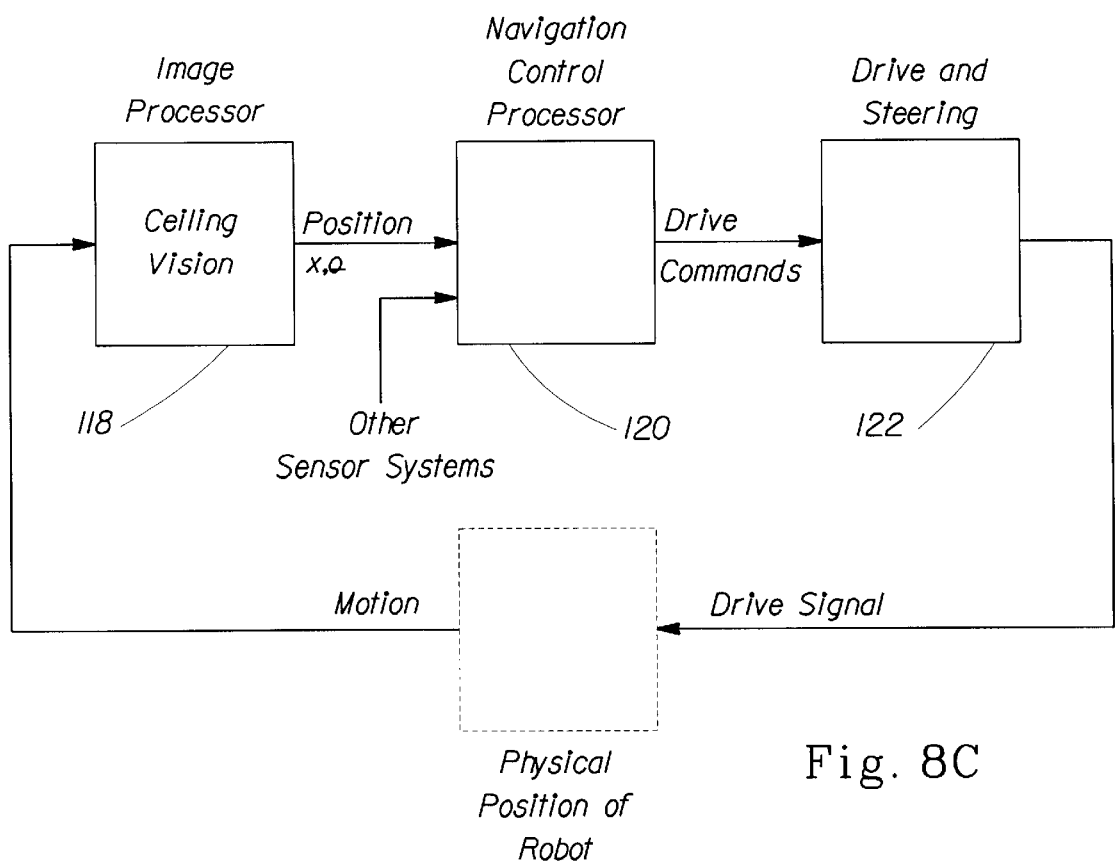
FIG. 8C is a block diagram which illustrates a feedback control system wherein ceiling related position measurements function as an error signal.

As can be seen in FIG. 8c the navigation control processor 120 is generally responsible for interpreting robot 110 position measurements generated by ceiling navigation image processor 118, in conjunction with possible inputs from other sensor systems, to control the drive system 122 in order to guide the robot 110 along a desired path. Thus, position measurements function as an error signal in a feedback control system wherein the drive and steering mechanisms serve as the actuators which change the position of the robot.

The camera 112 may be a model TM440 CCD camera manufactured by Pulnix. The camera 112 may have a relatively short focal length of, for example, 8.5 mm in order to maximize the field of view. Microcomputer 118D may be a member of the 68000 family of microprocessor devices manufactured by Motorola, Inc. LUT 118C and video memory 118A may be contained within a frame grabber pc-board such as a type manufactured by Coreco or Imaging Technologies.

Figure 10A:
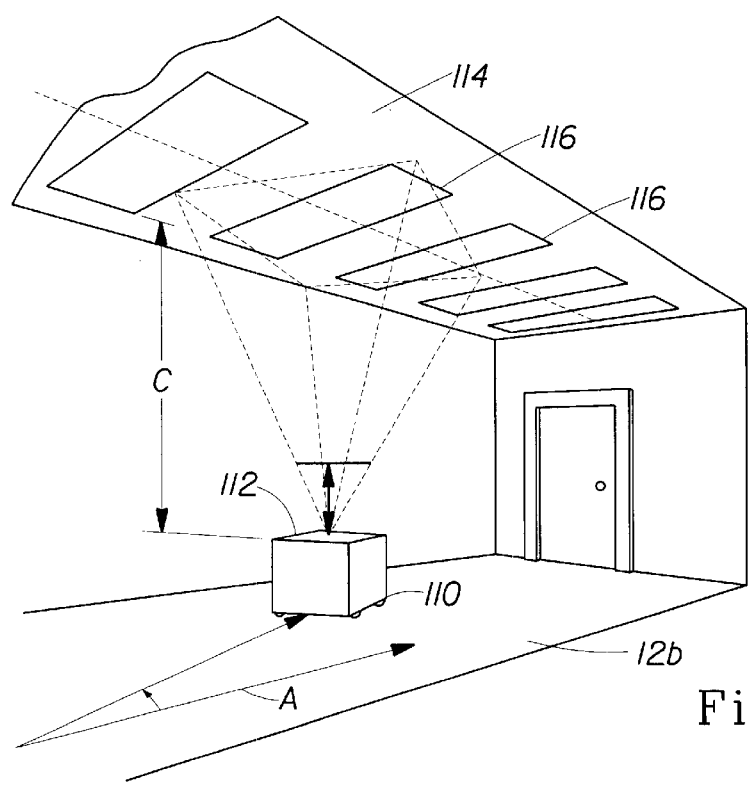
FIGS. 10a, 10b and 10c are illustrative views of the control system in FIG. 8a within an environment having a plurality of ceiling fixtures.

Referring briefly to FIG. 10a there is illustrated a typical institutional hallway. In a suitably thresholded camera image ceiling lights 116 are the overwhelmingly prominent visual features. The linear edges, or straight line boundaries, of the ceiling lights define, in accordance with the method and apparatus of the invention, reference lines for visual navigation.

As can be appreciated, when searching for and identifying the centers and edges of ceiling lights it is important to examine as few pixels as possible in order to reduce overall processing time. This search operation is facilitated by providing for an image threshold or a camera 112 aperture setting which causes the ceiling lights to appear as bright regions which are embedded within a dark background. A binary threshold technique may then be utilized to identify bright, illuminated pixels from dark pixels.

To initially locate a ceiling light in the image an initial preliminary search may be performed over the entire image, beginning at the top row of pixels and working towards the bottom row. Once a pixel is detected that has a value above a predetermined search threshold value the preliminary search is terminated. The predetermined threshold value is influenced by such factors as the type of camera employed, the camera aperture setting and/or the particular type of pixel thresholding. The preliminary search is preferably begun from the top of the image such that a ceiling light that is nearest to the robot will first be detected.

When a pixel above the threshold is detected a method of the invention, as described below, may thereafter employ a binary subdivision search. As an example; given a white point or pixel within a ceiling light there is next located an edge of the light where a transition from white to black occurs. This may be accomplished by moving outwards from the white point while examining pixel values to detect a transition from a pixel value which corresponds to that of the light to a pixel value which corresponds to the dark background. Of course, the pixel values may not normally correspond to fully white or fully black but will typically be expressed as varying shades of gray. Sampling every pixel while moving towards an edge of the light may be less than optimum in that the edge may be hundreds of pixels removed from the initially detected pixel. Therefore, a preferred method involves stepping initially by some relatively large increment of pixels, such as by 16 pixels per step. Stepping outward in 16 pixel increments continues until a pixel value indicates that the search has entered the dark background. At this time the search increment is divided by two and the search direction is reversed. This process of dividing the stepping increment and reversing the stepping direction continues until the step size is divided down to one. At that point the pixel under consideration is either one pixel into the bright light or one pixel into the dark background. This search technique is repeated, as described below, to detect multiple edges of a ceiling light in order to obtain sufficient information to accurately locate the left and the right edges and a center point of the light.

Figure 11A:
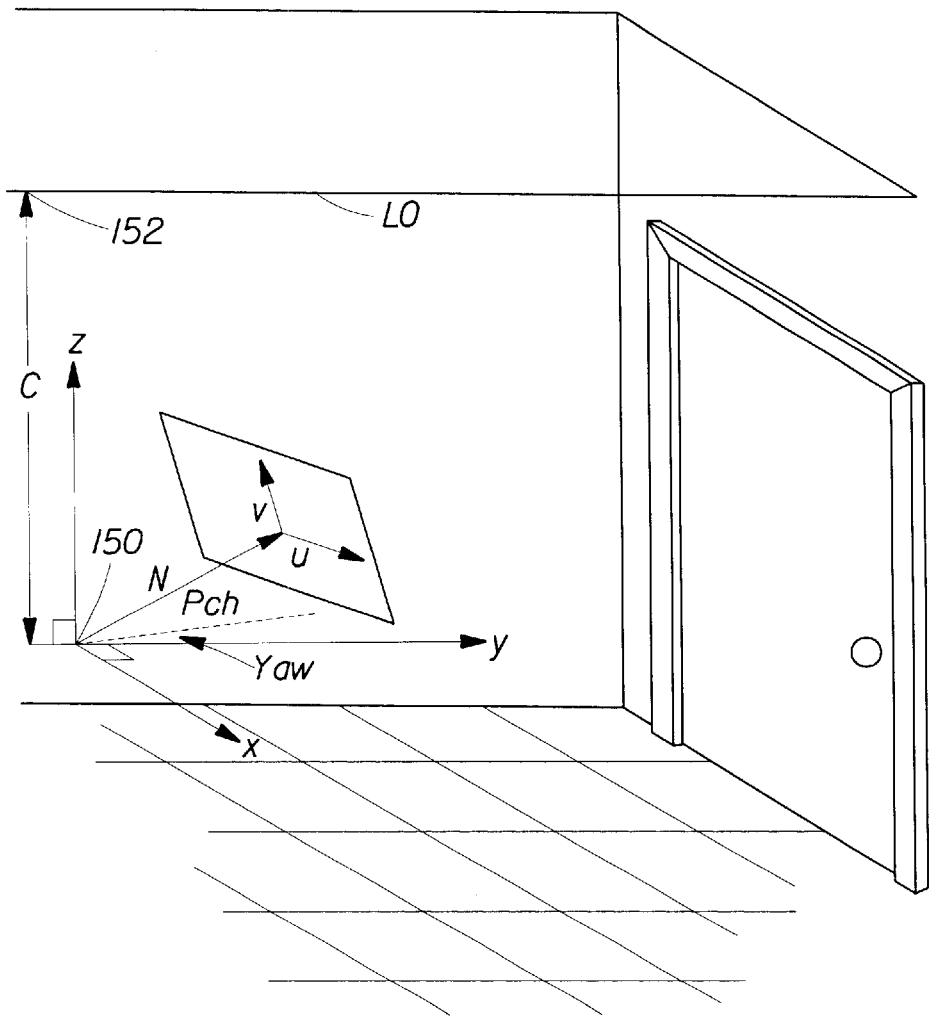
FIGS. 11a, 11b, 11c, 11d, 11e and 11f are graphical representations of the mathematical derivation of robot position relative to ceiling light fixtures.
Figure 11B:
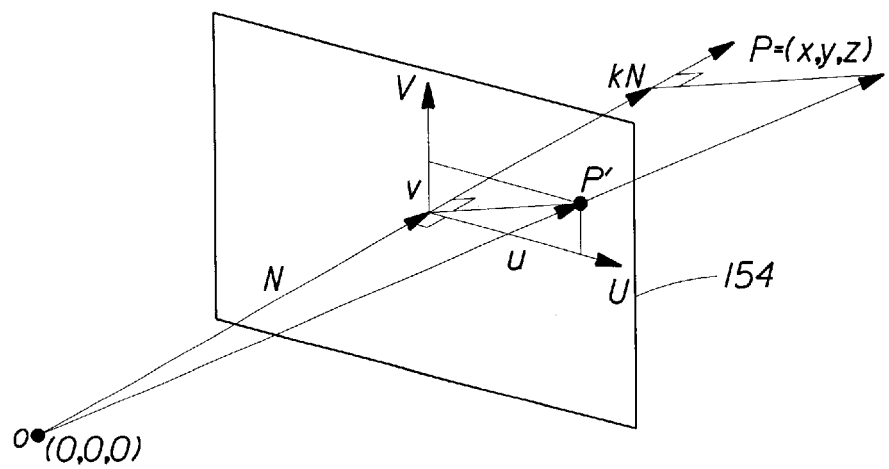
Figure 11C:
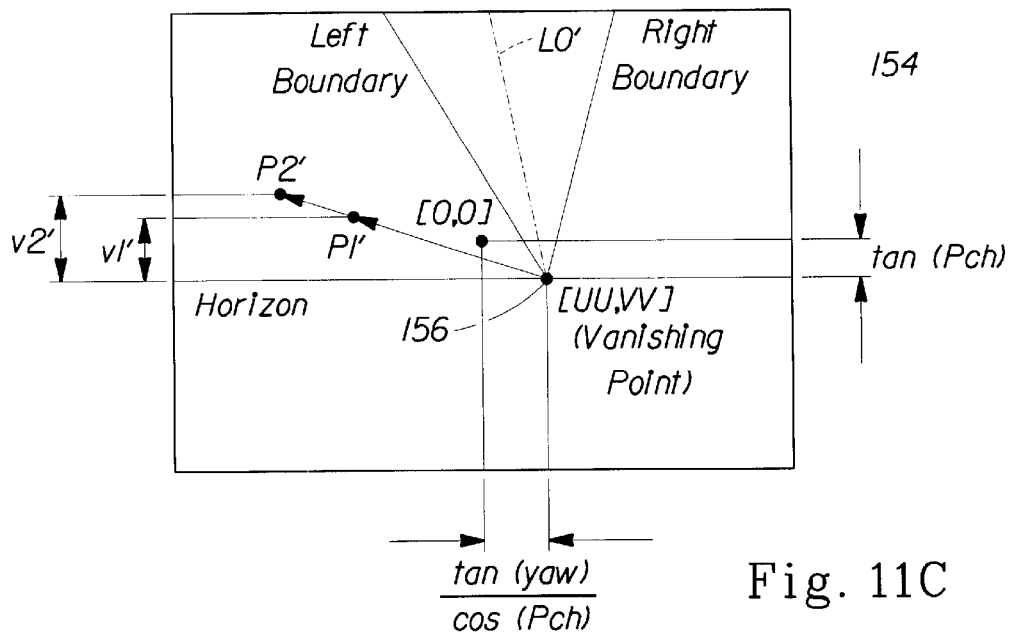
Figure 11D:
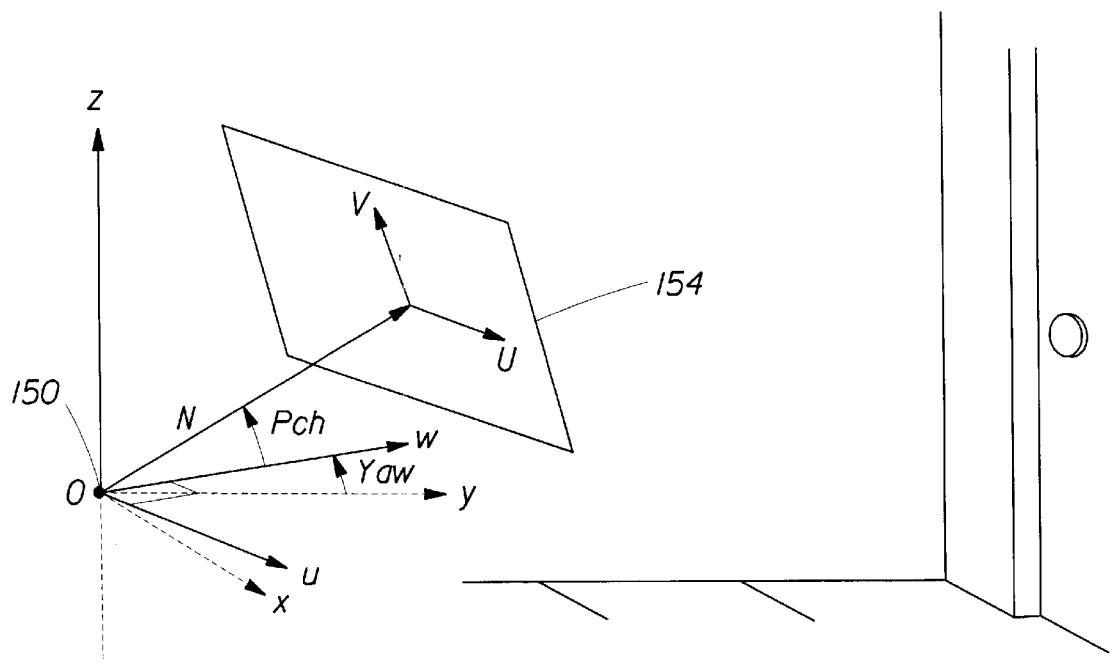
Figure 11E:
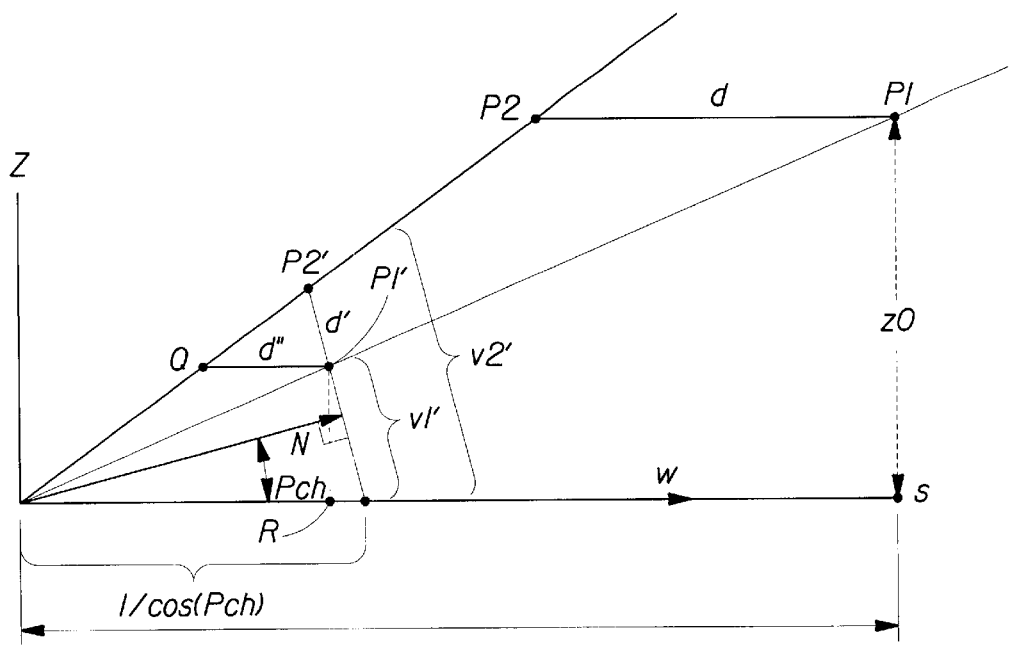
Figure 11F:
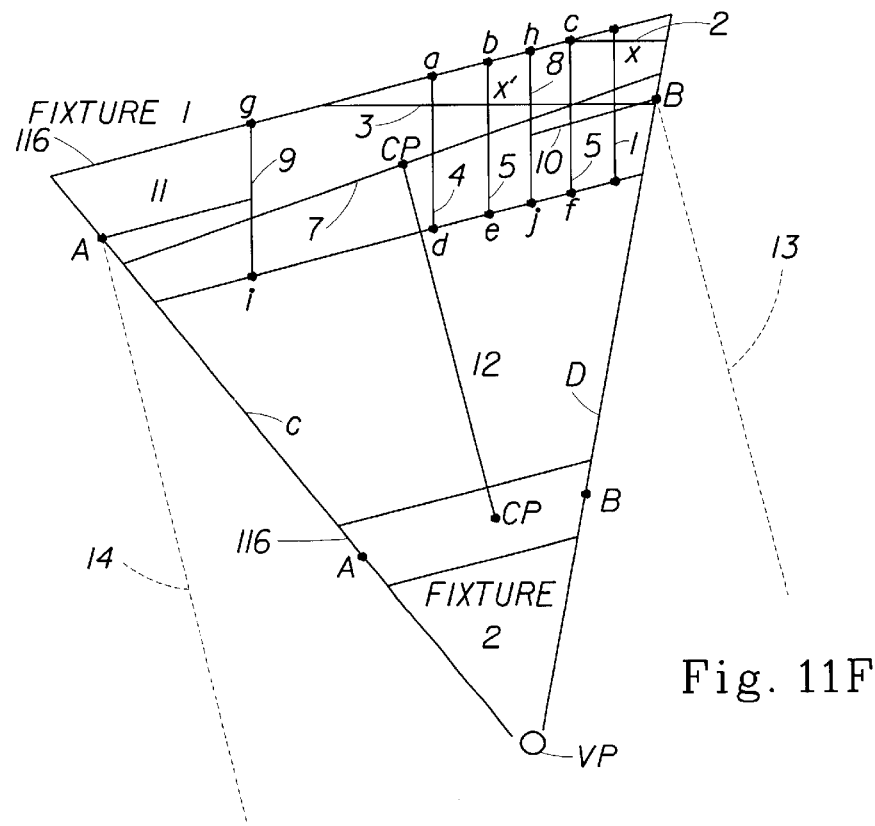

Referring to FIG. 11f it can be seen that after a pixel, designated by the point (X), within a light is found a vertical line (1) and a horizontal line (2) are projected through the point (X) to the edges of the light using the above described pixel search method. If the vertical line (1) is longer than the horizontal, a new horizontal line (3) is projected from the center of line (1). Instead, if the horizontal line (2) is longer a second vertical line is projected from the center of the horizontal line (2). These steps succeed in bringing the initial point, which may have been at an extreme edge of the light, farther into the center of the light as indicated by the point X'. Thereafter, the slope of the edges of the light is determined as described below.

A plurality of vertical lines (4, 5, and 6) are projected, one line (5) at the middle of the horizontal line (3) and the other two lines (4,6) approximately 25% in from the ends of the horizontal line (3). Thereafter, from the points (a, b, c, d, e, f) which define the ends of the vertical lines (4,5,6) there is found an average slope for the light. A line (7) is then projected which passes through the center of vertical line (5), the line (7) having a slope equal to the average slope of the light as previously calculated. It should be noted that the vertical lines (4, 5, 6) may have been drawn so close together that the calculated average slope may not be of high accuracy. Thus, the line (7) may not intersect the two ends of the light. Therefore, at points approximately 25% of the way in from the ends of line (7) two additional vertical lines (8,9) are projected and the average slope from the end points (g, h, i, j) of lines (8,9) is determined. From the center point of each of the two vertical lines (8,9) a line (10 and 11, respectively) is projected toward the nearest edge of the light along the most recently computed average slope. The edge transition between illuminated and nonilluminated pixels sensed along lines 10 and 11 indicate the true ends of the light (A,B). At a point halfway between the edges (A,B) is the center point of the light (CP).

After accurately locating one light a second light is found and analyzed in a substantially identical manner in order to generate a set of points with which to project lines (C,D) to the vanishing point at the horizon.

To find the second light a line (12) is projected downwards in the image from the center (CP) of the first light and perpendicular to the slope of line (7). Pixels along the line (12) are analyzed to determine if another light is encountered. Because of the differing angles which the lights may assume relative to one another line (12) may not intersect a second light. If this is the case two more lines (13,14) are projected from the ends of the first light perpendicularly to the line (7) to determine where and if a second light is intersected. From lines (12,13,14) it is assured that one of them will intersect another light if there is one.

It should be realized that the preceding description of a method of locating edges of ceiling lights is but one suitable technique. For example, known methods of finding straight line patterns in a video image include the use of Hough transforms, edge detection and linking, and curve fitting.

Figure 9A:
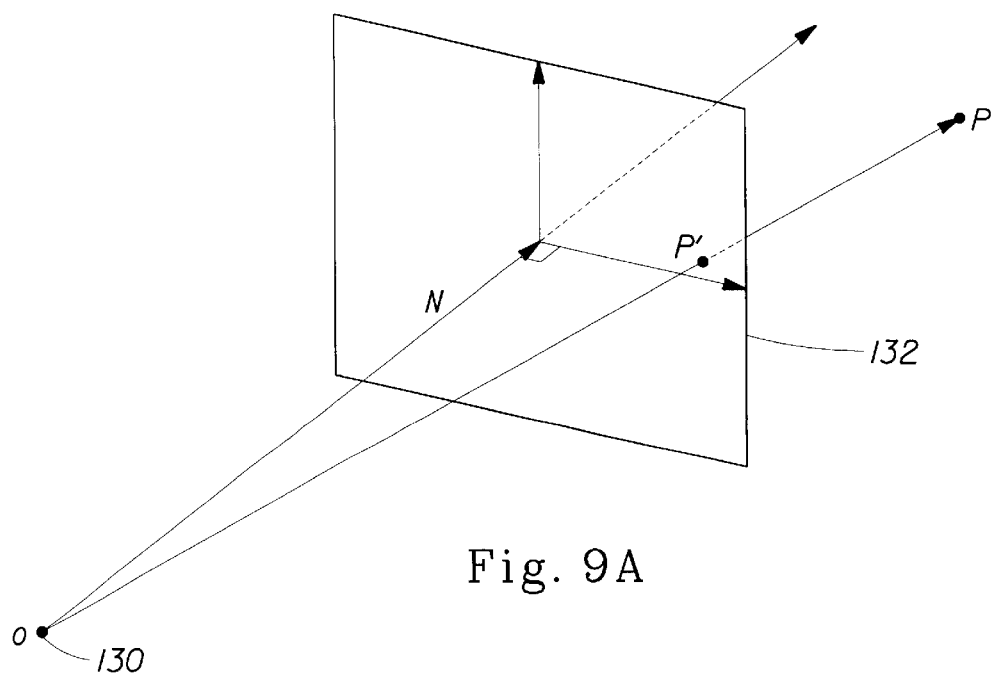

Referring to FIG. 9a it is shown that the camera 112 configuration is treated geometrically as a viewpoint 130 and an image plane 132. The viewpoint 130 may be considered as the center of the camera lens. Images are projected perspectively from an arbitrary point P in three dimensional space onto point P, in the image plane 132, along a line through the viewpoint 130. It is mathematically convenient to consider the image plane 132 to be a unit distance from the viewpoint 130. N is the unit vector normal to the image plane 132. Thus units of distance measured in the image plane correspond to the tangent of the angle from the normal N through the viewpoint 130 perpendicular to the image plane 132. This convention provides for the scaling of the view angle tangent with respect to camera 112 pixel count as follows.

Figure 9B:
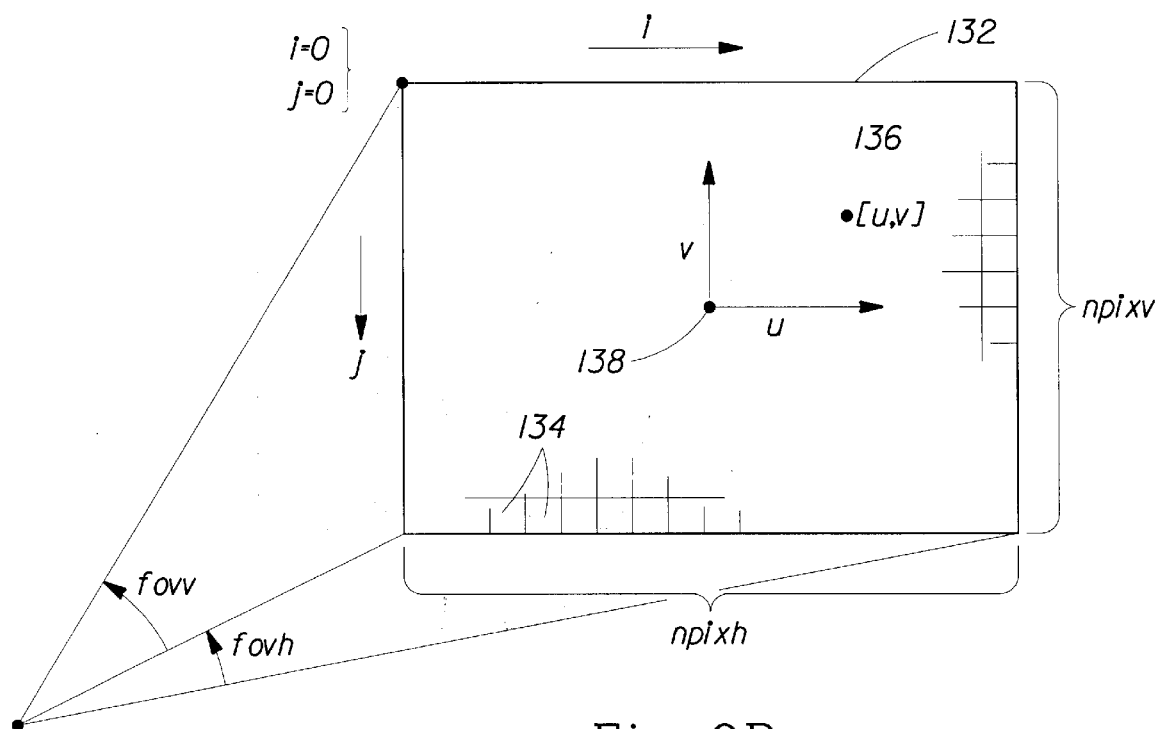

Referring to FIG. 9b it can be seen that the horizontal angle of field of view of the camera 112 is designated as fovh and the vertical angle of field of view is designated as fovv. The image plane 132 is rectangular and is positioned symmetrically with respect to the camera FOV, as is standard in most video cameras. Npixh is the number of pixels 134 in a horizontal line and npixv is the number of vertical rows of pixels 136. Image plane 132 (u,v) coordinates are given in tangent units, respectively horizontal and vertical, from the center 138 of the image plane 132. The following equations convert pixel coordinates to tangent coordinates:

$$u=(i-npixh/2)*(\tan(fovh/2)/(npixh/2) \text{ and} \quad (1)$$

$$v=(j-nipxh/2)*(\tan(fovh/2)/(npixv/2); \quad (2)$$

where i and j are the column number and row number, respectively, of a pixel from the upper left corner of the image plane 132. As used herein the symbol denotes multiplication and the symbol "/" denotes division. The pixel coordinate to tangent coordinate conversion of Equations 1 and 2 corrects the camera 112 aspect ratio and simplifies the discussion of coordinate transformations and projections which follows. The inverse equations which yield pixel number from view angle are as follows:

$$i=u*(npixh/2)/\tan(fovh/2)+npixh/2 \text{ and} \quad (3)$$

$$j=v*(npixh/2)/\tan(fovh/2)+npixv/2. \quad (4)$$

For a typical CCD video camera having an 8.5 mm focal length and a conventional frame grabber the following relationships apply:

npixh=512 pixels;

npixv=480 pixels;

fovh=55 degrees;

fovv=42 degrees.

FIG. 10a illustrates, in accordance with one aspect of the invention, a zenith gazing camera 112 mounted to the robot 110. Distance from the camera 112 viewpoint to the ceiling 114 is "c". The image plane u-axis is aligned with a vehicle forward axis. Yaw angle, theta, is measured between the u axis and a long axis, designated as A, of the hallway. The image of the ceiling as viewed by camera 112 is illustrated in FIG. 10b.

Figure 10B:
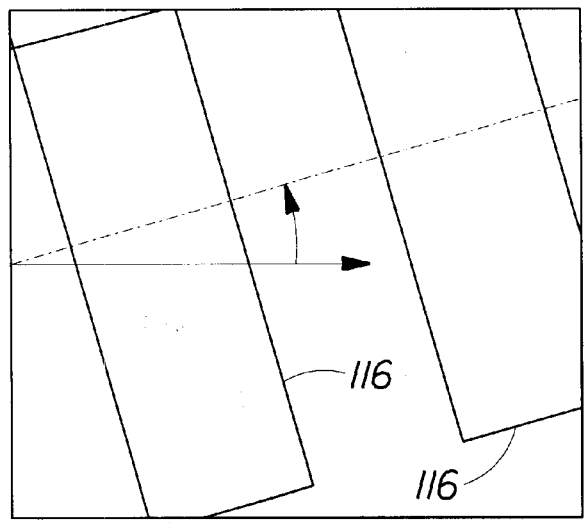

The angle of rotation of the ceiling image on the camera 112 image plane is equal to the vehicle yaw angle, as illustrated in FIGS. 10a and 10b. The precision of measurement accuracy depends in part on the accuracy of identifying a linear edge, or boundary, of a ceiling light 116 and also upon the length of the boundary. In a typical environment, the edge of a light 116 may subtend 100 pixels while the edge measurement may be accurate to within two pixels. This corresponds to approximately 0.2 radians accuracy in yaw measurement, or slightly more than one-half of a degree.

Figure 10C:
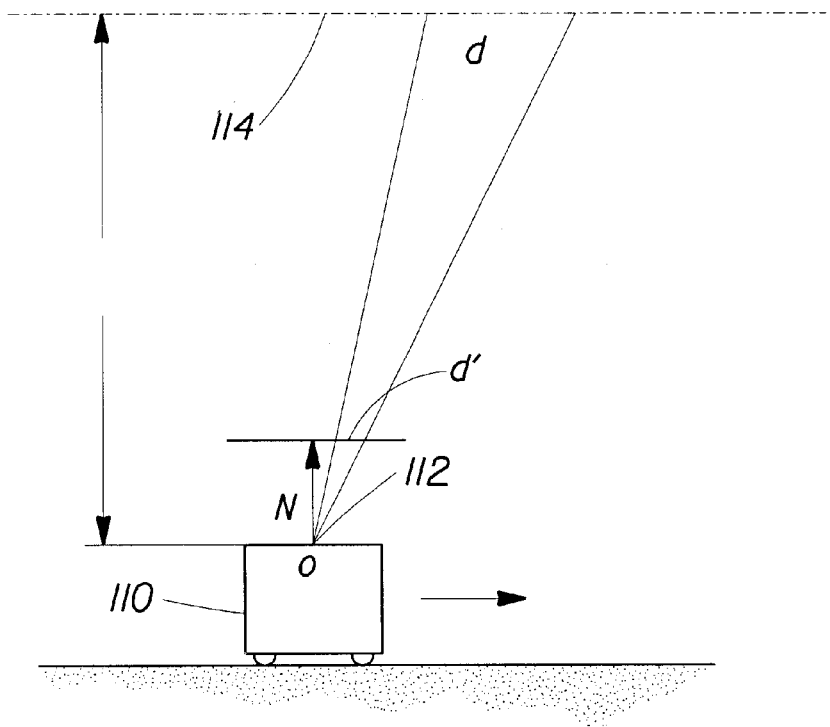

As the robot 110 moves a distance d along the floor 126, as measured by wheel encoders or odometers, the zenith projection of the view axis moves d units along the ceiling 114. Points in the image of the ceiling move distance d' in image plane u-v units. FIG. 10c illustrates this movement relative to vehicle 110 coordinates, that is, as if the vehicle 110 were stationary and the ceiling 114 moved distance d. An analysis of similar triangles yields the ceiling distance above the camera 112 viewpoint as:

$$C=d/d'. \qquad (5)$$

Generally $$d'=sqrt(u2+v2), \qquad (6)$$

where "sqrt" indicates a square root function and "**" indicates exponentiation. Equation 6 reduces to $$d'=u \qquad (7)$$

for camera 112 horizontal lines aligned with the direction of motion.

Considering an example in which the camera 112 is 2.5 feet above the floor 126, the ceiling 114 has a height of 10 feet and the robot 110 moves two feet per second, then c=7.5 feet. In 250 milliseconds the robot 110 moves six inches. Therefore d'=d/c=0.5/7.5 or 0.0666 tangent units. For a camera 112 having a FOV of 55 degrees with 512 pixels per row, this motion corresponds to 32 pixels. If c is unknown in advance, an image motion of 32 pixels within 250 milliseconds implies that the ceiling 114 is 10 feet above the floor, it being given that the camera 112 height above the floor is 2.5 feet. Thus, ceiling height may be directly inferred.

The accuracy of motion measurement is derived from pixel "footprint" size on the ceiling 114 as follows. In the example given above the fovh=55 degrees thus one pixel represents u=tan (fovh/2)/256=0.002 tangent units. Hence, d=c*d'=7.5*0.002=0.15 feet or 0.18 inches. While this error term may exceed that of the instantaneous motion encoder accuracy it should be realized that this error term is absolute, not cumulative, over time. Thus, if motion encoder based measurements are accurate to approximately 1%, visual observation of the ceiling 114 surpasses motion encoder based dead reckoning accuracy after only 18 inches of floor travel. However, the vehicle 10 platform may wobble somewhat due to floor surface irregularities and absorption of acceleration in the suspension of the vehicle 110 platform. A two degree tilt of the vehicle 110 projects to a three inch error on the ceiling 114, or roughly 17 pixels. If wobble of this magnitude is common, one suitable method to reduce the effect of wobble on positional registration is to use zenith gazing visual observations at intervals of three feet or more of floor travel. Kalman filtering techniques, based on covariance matrices of uncertainties, may also be employed to merge visual and encoder based position estimates thereby maintaining absolute position control.

The footprint ("headprint") of the viewscreen on the ceiling 114 for the example given above is approximately eight feet. If lights 116 are spaced more than four feet apart, and one set of lights is burned out, there will be robot positions for which no lights are visible. Using conventional CCD cameras and lenses, the FOV cannot readily be widened beyond approximately 55 degrees without inducing a "fisheye" type of distortion. This form of distortion, or aberration, distorts the linearity of images of lines, which in turn significantly complicates the geometry of image processing. A preferred solution to this limitation is to aim the camera 112 obliquely upward from the horizon, viewing an area of the ceiling ahead of the vehicle 110 and along a projected forward path of the robot.

The following description sets forth the geometry and calculations to infer vehicle orientation and lateral position in an environment, such as a hallway, from an image of ceiling lights. The following description makes use of an imaging device, such as a camera, which is pitched up obliquely at an intermediate angle between the horizon and the zenith. The ceiling lights are preferably of rectangular shape and are aligned with the hallway. The ceiling lights may be arranged with their long axis parallel to or perpendicular to a long axis of the hallway. The lights may comprise incandescent or fluorescent bulbs and may or may not be covered. Preferably the lights present a pattern or alignment which is substantially parallel to or perpendicular to the long axis of the hallway. That is, the shape being detected may be either a line boundary or a linear row of simple shapes, such as light bulbs. The inferred axis of alignment is treated as a geometric line in the following discussion.

It is convenient to center the origin at the viewpoint of the camera 112 and to adopt right-handed Cartesian coordinates (x,y,z) aligned with the hallway as follows. The z-axis is vertical, the y-axis points down the hallway parallel to the long axis of the hallway and the x-axis is perpendicular to the long axis of the hallway. Position is referenced from the camera 112 and direction is referenced with respect to the walls of the hallway. Hence the designation "cam-wall" coordinates which will be employed hereinafter.

FIG. 11a illustrates the general configuration of the cam-wall coordinate system. The distance from a camera 150 to a ceiling 152 is c. The ceiling plane is characterized as −infinity<x<infinity, −infinity<y<infinity and z=c. The camera 150 is pitched up by an angle Pch radians and yawed over by an angle Yaw radians. There is no roll component in that camera raster lines are parallel to the ceiling, floor and horizon planes. Pch is measured from the x-y plane vertically to the viewplane normal vector N. Yaw is measured as the angle between the y-z plane and the vertical plane containing the vector N. From these definitions, it is apparent that the normal vector N is given by:

$$N=(x, y, z)=(\cos(Pch)\sin(Yaw), \cos(Pch)\cos(Yaw), \sin(Pch)). \qquad (8)$$

That is, the vertical component of N is sin(Pch). The horizontal component is cos(Pch), which decomposes into x and y components in the ratio cos(Yaw):sin(Yaw).

Perspective projection from cam-wall coordinates to image coordinates is illustrated in FIG. 11b. A general vector P (x, y, z) in three dimensional space is connected to the origin by a straight line. It intersects the image plane 154 at $$p'=(x', y', z')=P/k=(x/k, y/k, z/k), \qquad (9)$$

which defines a scaled image of P. The scale factor k is the length of the projection of P onto the screen normal N, namely, $$k=P(dot)N \qquad (10)$$

by virtue of similar triangles ONP' and O(kN)P. The (dot) operation is a vector dot product given by $$k = x^* \cos(Pch)^* \sin(Yaw) + y^* \cos(Pch)^* \cos(Yaw) + z^* \sin(Pch). \quad (11)$$

Image coordinates [u,v] from the center of the image plane 154 are expressed with respect to the unit vectors U and V, namely $$[u,v] = u^*U + v^*V, \quad (12)$$

where U and V are vectors and u and v are scalars. U is a horizontal unit vector perpendicular to the x-y plane footprint of N. In cam-wall coordinates, $$U = (\cos(Yaw), \sin(Yaw), O). \quad (13)$$

V is a unit vector perpendicular at both N and U, that is, the vector cross product of N and U which is given by $$V = UXN = \quad (14)$$

$$det \begin{bmatrix} I & J & K \\ \cos(Yaw) & \sin(Yaw) & O \\ -\cos(Pch)*\sin(Yaw) & \cos(Pch)*\cos(Yaw) & \sin(Pch) \end{bmatrix}$$

where I, J, K are the unit basis vectors of the (x, y, z) cam-wall coordinates.
That is, $$V = (\sin(Pch)^* \sin(Yaw), -\sin(Pch)^* \cos(Yaw), \cos(Pch)). \quad (15)$$

The image plane 154 coordinates of the image of a point P are the projections of P' onto U and V, namely, $$u = p'(dot)U \quad (16)$$

$$v = p'(dot)V \quad (17)$$

which expands to $$u = (x/k)^* \cos(Yaw) + (y/k)^* \sin(Yaw), \text{ and} \quad (18)$$

$$v = (x/k)^* \sin(Pch)^* \sin(Yaw) - (y/k)^* \sin(Pch)^* \cos(Yaw) + (z/k)^* \cos(Pch). \quad (19)$$

A row of ceiling lights along the axis of the hallway defines a line, LO, which is parallel to both the walls and the floor. In cam-wall coordinates, the equation of line LO is $$x = xO, \ y = s, \ z = zO \quad (20)$$

where s is a line LO length parameter, Which may range from plus to minus infinity. Values xO and zO are the lateral and vertical distances of the line from the viewpoint. The projection of this line onto the image plane 54 is $$u = (xO/k)^* \cos(Yaw) + (s/k)^* \sin(Yaw), \text{ and} \quad (21)$$

$$v = (xo/k)^* \sin(Pch)^* \sin(Yaw) - (s/k^* \sin(Pch)^* \cos(Yaw) + (zo/k)^* \cos(Pch) \quad (22)$$

where $$k = xO^* \cos(Pch)^* \sin(Yaw) + s^* \cos(Pch)^* \cos(Yaw) + zO^* \sin(Pch). \quad (23)$$

As s goes to infinity, u and v approach the limits [u,v] .fwdarw.[uu,vv], where $$uu = \sin(Yaw)/(\cos(Yaw)^* \operatorname{cis}(Pch)) = \tan(Yaw)/\cos(Pch), \text{ and} \quad (24)$$

$$vv = -\tan(Pch) \quad (25)$$

As seen in FIG. 11c the projected the image LO' of the ceiling line LO approaches a vanishing point 156 on the screen. This vanishing point 156 is the intersection of the images of all lines parallel to LO, i.e. with all possible choices of xO and zO. Intuitively, it is a point on a horizon where two parallel lines, such as railroad tracks, would appear to converge and meet.

This converging line analogy is advantageously employed, in accordance with a method of the invention, to determine the values of uu and vv. That is, two lines within the image plane 154 are selected which are images of ceiling features known to be in a parallel relationship, such as the left and right boundary of a row of ceiling lights 116 as in FIG. 10a. The intersection in image plane coordinates of the two boundaries is then determined by the substitution of the equation of one boundary into the other. The determined intersection point may lie physically off the image plane 54 but nevertheless yields values for the vanishing point uu and vv. Pitch is thus $$Pch = -\arctan(vv) \quad (26)$$

and yaw is $$Yaw = \arctan(uu^* \cos(Pch)). \quad (27)$$

It should be noted that vv is independent of Yaw. The value of v is therefore the horizontal line on the screen that is the image of the horizon.

Returning briefly now to a consideration of FIG. 11a it should be recalled that once camera pitch (Pch) is known, ceiling height may be inferred from the motion of image features as the vehicle 110 moves along the floor. To further clarify the relevant geometry, it is useful to consider a coordinate system which aligns with the forward direction of the camera and vehicle motion. This is accomplished by rotating the x-y plane of the cam-wall coordinate system such that it aligns with the horizontal component of the image plane 154 normal N. FIG. 11d illustrates this new coordinate system. Note that the z-axis is in common with the cam-wall coordinates while the x-axis the y-axis are replaced by a u-axis and a w-axis whose basis vectors are $$U = \cos(^*Yaw), \sin(Yaw), 0) = \{1,0,0\}, \quad (28)$$

$$W = -\sin(Yaw), \cos(Yaw), 0) = \{0,1,0\} \quad (29)$$

And $$Z = \{0,0,1\} \quad (30)$$

The brace notation {u, w, z} denotes coordinates with respect to the basis U, W, Z which will be referred to herein as the "cam-floor" coordinates system. Both the cam-wall and cam-floor coordinate systems use the camera viewpoint as the origin 150. Conversion from (x,y,z) to {u,w,z} is accomplished by the transformation:

$$\{u, w, z\} = (x, y, z) \begin{bmatrix} \cos(Yaw) & -\sin(Yaw) & 0 \\ \sin(Yaw) & \cos(Yaw) & 0 \\ 0 & 0 & 1 \end{bmatrix} \quad (31)$$

The inverse transformation is accomplished by $$\{x, y, z\} = (u, w, z) \begin{bmatrix} \cos(Yaw) & \sin(Yaw)] & 0 \\ -\sin(Yaw) & \cos(Yaw) & 0 \\ 0 & 0 & 1 \end{bmatrix} \quad (32)$$

Referring to FIGS. 11b, 11c and 11e and considering the trajectory of a point P on the ceiling in cam-floor coordinates as the robot moves forward, u=uO, w=s and z=zO, where s is the parameter of distance travelled in direction W. The image of this line is derived by projection onto the image plane 154 as follows. The image plane U basis vector is the same as for cam-wall coordinates, as previously set forth in Equation 28.

The image plane 154 normal in cam-floor coordinates is given by $$N=\{O, \cos(Pch), \sin(Pch)\} \quad (33)$$

and the image plane 154 basis vector (V) is $$V=\{O, -\sin(Pch), \cos)Pch)\}. \quad (34)$$

Thus P projects onto the screen at $$p'=P/k=\{uO/k, s/k, zO/k\} \quad (35)$$

where $$k=P(dot)N=s*\cos(Pch)+zO*\sin(Pch), \quad (36)$$

Image plane 154 coordinates are derived by projecting p' onto U and V, $$U=P'(dot)U=uO/k, \text{ and} \quad (37)$$

$$V=P'(dot)V=-s*\sin(Pch)/k+zO*\cos(Pch)/k$$

These image lines, which represent the streamlines of optic flow, all radiate from the vanishing point, $$[uu, w]=[O, -\tan(Pch)]. \quad (38)$$

Transforming the origin of image plane coordinates to this point, using the primed bracket to denote the new image plane coordinate system, $$[u', v']=[u-uu, v-vv] \quad (39)$$

implies that an arbitrary optic flow line maps into $$[u'v']=uO/k, zo/(s=zO*\tan(Pch)]', \text{ or}$$

$$[u'v']=-u[uo/k,zo/k*\cos(Pch))]'. \quad (40)$$

Thus, the slope of the optic flow line is $$v'/u'=zO/(uO*\cos(Pch)). \quad (41)$$

It is noted that the v' component is independent of uO which simplifies the computation of ceiling height as will be shown.

FIG. 11e illustrates the w-z component of image plane and ceiling. The u-component can be ignored in computing zO as previously shown. As the vehicle 110 moves forward distance d in the direction W, the footprint ("headprint") of the screen moves distance d along the ceiling. Any point P1 moves distance d to P2; the corresponding images on the screen are P1' and P2', separated vertically by d' in the image plane. That is, v2'-v1'=d'.

As can be seen d' and d" are a side and a base, respectively, of a triangle similar to the one formed by the image plane 154 w-axis and the line 0-P2'. Thus, $$d''/d=(1/\cos(Pch))/v2', \text{ or}$$

$$d''=d'/(v2'*\cos(Pch))=(v2'-v1')/v2'*\cos(Pch)). \quad (42)$$

Inasmuch as d" and d are corresponding parts of similar triangles 0-P1'-Q and 0-P1-P2 whose altitudes, indicated by the vertical dashed lines in FIG. 11e, are v1'*cos (Pch) and zOit can be realized that $$zO/d=v1'*\cos(Pch)/d'', \text{ and} \quad (43)$$

$$zO=C=d*v1'v2'*\cos 2(Pch)/((v2'-v1'). \quad (44)$$

Equation 44 gives ceiling elevation as a function of image plane 154 pitch and the image plane 154 vertical coordinates, [v1', v2',], of two successive images of a feature, the vehicle traveling a distance d between images. The ratio of d" to d is the same as the ratio of the w-component of ranges from the origin to P1' and P1, respectively, by virtue of similar triangles 0-P2'-R and 0-P1-S. Thus, $$w1/d=(1/(\cos(Pch)-v2'*\sin(Pch))/d'' \quad (45)$$

which implies $$(w1=d*v2'*(1-v1'*\sin(Pch)*\cos(Pch))/(v2'-v1'). \quad (46)$$

Thus, the invention provides for range to be inferred from the same image data that yields ceiling height. Lateral displacement of the robot 10 from the tracked ceiling feature is derived below.

Recalling from Equation 41 that the slope of the image line is v'/u'=zO/(uO*cos(Pch) the lateral position of the tracked feature relative to the robot path (u-axis coordinate) is $$uO=(u1'/v1')*zO/\cos(Pch), \text{ and} \quad (47)$$

$$uO=(u2'/v2')*zO/\cos(Pch). \quad (48)$$

If ceiling height is known, either from a database, sonar readings, or from the optic flow analysis as described above, the position of the robot 110 with respect to the center line LO, or any other measurable line, of the ceiling may be derived in hallway coordinates as described below. Robot pitch and yaw are also necessary inputs. As shown in the preceding discussion, pitch and yaw may be derived from the image plane 154 coordinates of the vanishing point 56.

The cam-wall origin and the line LO described previously define a plane known as an epipolar plane.

The system includes a means for obtaining an image of a surface which overlies a robot or a projected path of the robot, the surface having one or more sources of illumination disposed thereon; means, coupled to the obtaining means, for detecting within the image a location of the one of more sources and means, coupled to the detecting means, for generating, from the detected source location or locations, vehicle navigation information. The generating means is shown to include means for determining at least an offset distance and an angular displacement of the vehicle relative to the location of the source within the image. Further in accordance with the invention there is disclosed a method of providing navigation related information for a mobile robot. The method includes the steps of (a) obtaining at least one image of a ceiling having one or more distinct visual features, the ceiling overlying at least the projected path of the robot; (b) locating within the ceiling image the one or more distinct visual features; (c) detecting a boundary of the distinct visual features; (d) generating at least one reference line relative to the detected boundary; and (e) determining a location of the robot relative the reference line.

Yet another means of mapping suitable for inclusion as a guidance system in the present invention is the triangulation from plural radio frequency beacons, which is known in the art. Such a guidance system is shown and described in U.S. Pat. No. 5,974,347 (Nelson, issued Oct. 26, 1999), which is herein incorporated by reference.

Figure 12:
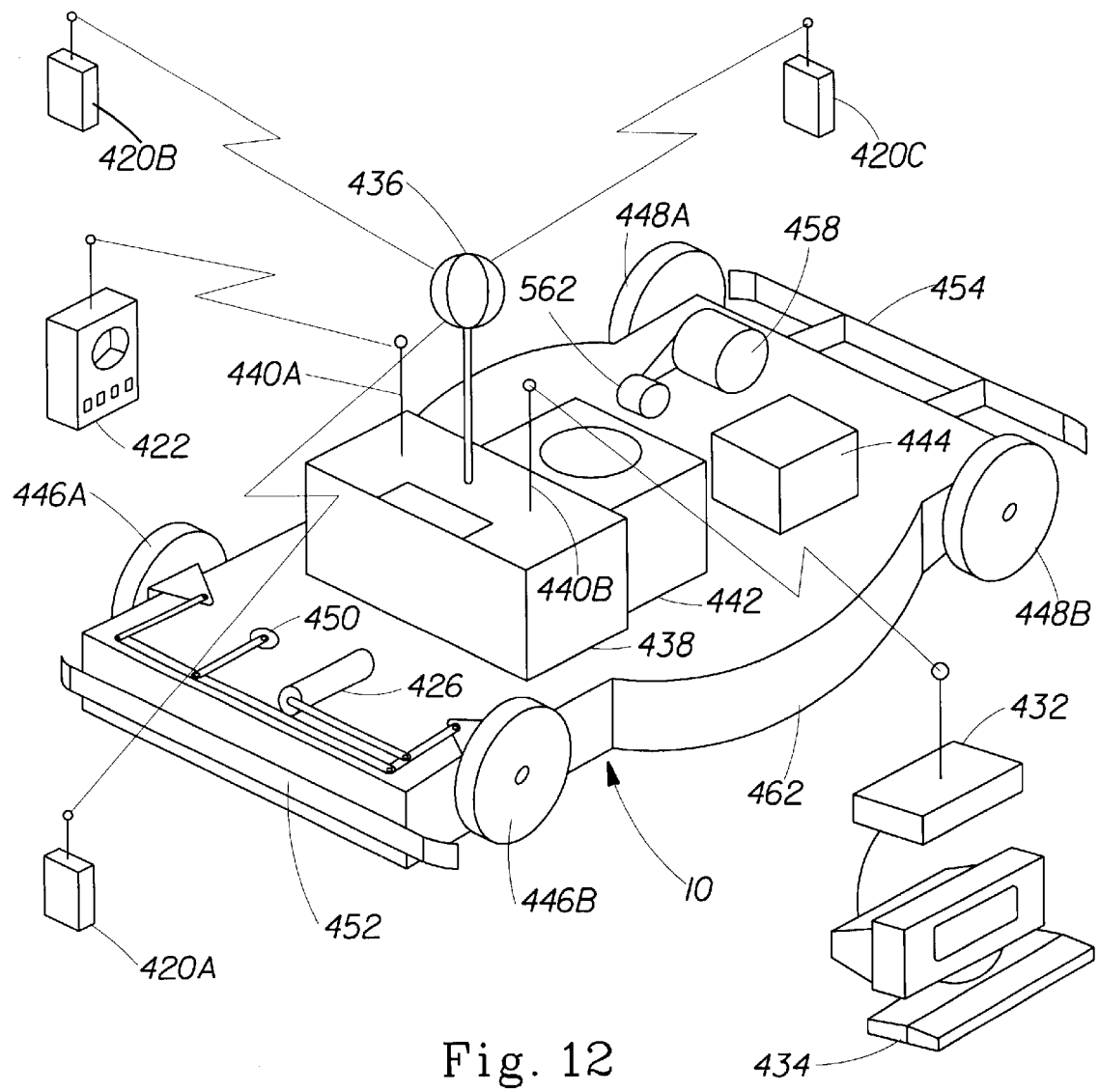
FIG. 12 is a perspective view of a robot having a triangulation control system.

In this embodiment, the guidance system uses three stationary radio sources placed in known locations and a receiver with a rotating directional antenna located on the robot to triangulate the robots position and to build a map during the training of the robot. To start the programming phase of operation, the user places the continuous wave transmitters 420A, B, and C in a right angle formation somewhat outside the area to be cleaned. Although, FIG. 12 shows one particular platform design with this guidance system, any platform can be used, including but not limited to the platform design shown in FIG. 1. The following description is for illustrative purposes only and not meant to limit the invention.

Referring to FIG. 12, the platform 10 includes a whip antenna 440A that receives data from a hand-held programmer transmitter 422. Another whip antenna 440B, included on the platform, communicates with a central processor or computer 434 via a transceiver interface 432. A directional loop antenna 436 receives radio frequency signals from continuous wave transmitters 420A, 420B, and 420C. A housing 438 supports these antennas. Directional loop antenna 436 is located between the whip antennas. A selector switch 548 and a keypad/display 464 are mounted for convenient access near the whip antennas.

Figure 13:
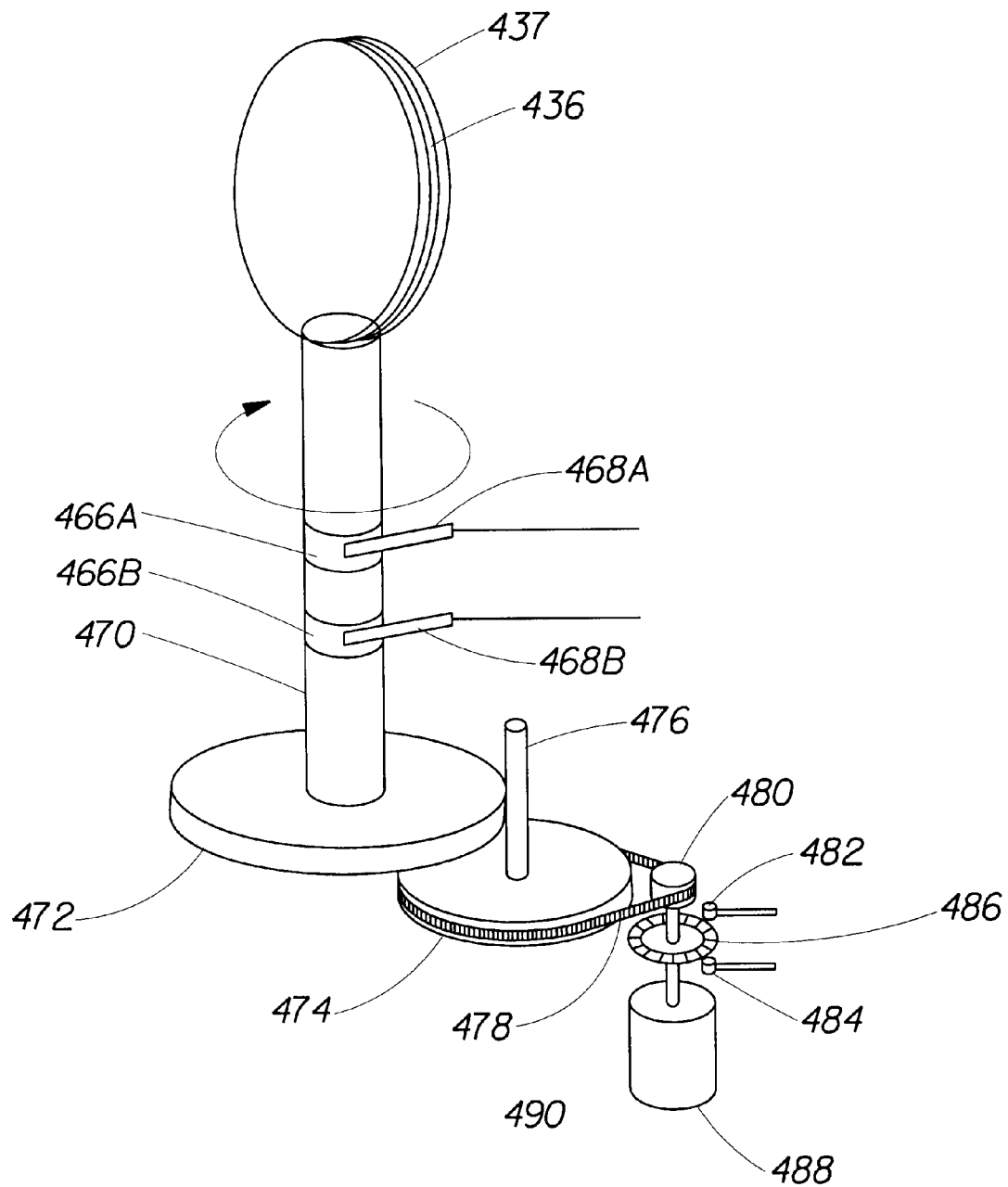
FIG. 13 shows a perspective view of the rotating directional loop antenna.

FIG. 13 is a perspective view of one particular embodiment of the directional loop antenna 436. The antenna is a coil of several turns of wire wound on a form 437. The form is a plastic cylinder attached by glue to a plastic support tube 470. Leads from the coil pass down the inside of the support tube to two slip rings 466A and 466B. A pair of contact brushes 68A and 68B connect the slip rings to leads, which carry the radio frequency signal to a radio frequency amplifier 510 in FIG. 15. The support tube is attached to a wheel 472. Wheel 472 is driven by friction contact on its circumference by a shaft 476. Shaft 476 is directly connected to a pulley 474. Pulley 474 is connected to a pulley 480 by a drive belt 478. Pulley 480 is connected to a motor shaft 490 of a direct current electric motor 488. A notched disk 486 is centered on shaft 90 to chop a light beam produced by a light source 482 and a light sensor 484.

Figure 14A:
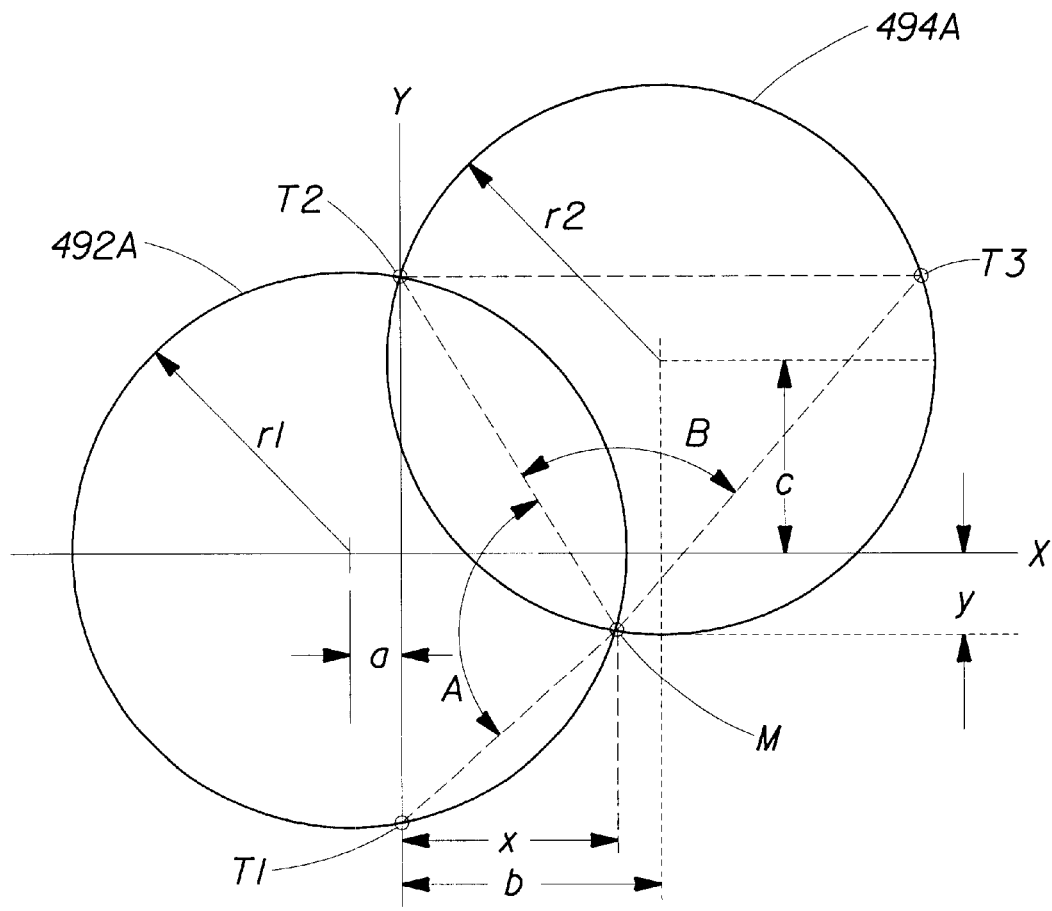
FIG. 14A shows a diagram of two circle equations together showing the intersection which provides the x-y coordinates defining the location of the robot using the triangulation control system in FIG. 12.

FIG. 14A shows an example x-y coordinate system defined by the locations of continuous wave transmitters 420A, 420B, and 420C. These transmitters are shown as points T1, T2 and T3, respectively, in a right angle configuration. The location of home cleaning robot of FIG. 12 is depicted as M in FIG. 14A. Angle A formed by T1, T2 and M defines a locus of points which is a circle 492A with an offset a on the x-abscissa. An equation 492B then describes circle 492A. Similarly Angle B formed by T2, T3 and M defines a locus of points which is a circle 494A with an offset b in the x-abscissa, and an offset c in the y-ordinate. An equation 494B then describes circle 494A. The solution of the two simultaneous circle equations provides the value x in an equation 496 and the value y in an equation 498.

Figure 14B:
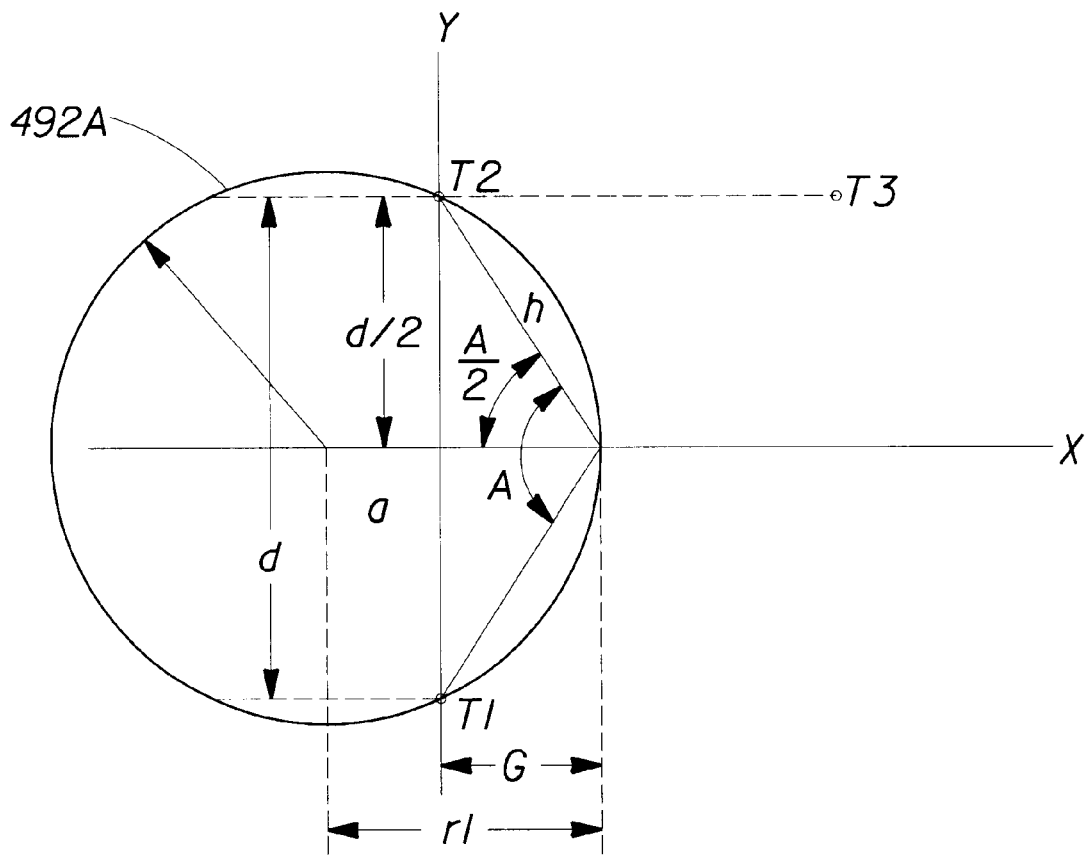
FIG. 14B shows a diagram of one circle defined by the angle A and the chord between transmitters T1 and T2, with the offset a and radius r1.

FIG. 14B shows circle 492A with its radius r1, and its offset a. An equation 100 calculates radius r1 and an equation 502 calculates offset a from the value of angle A and distance d. Angle A is the angle measured by the directional loop antenna between transmitters T1 and T2. Distance d is the distance between transmitters T1 and T2.

Figure 14C:
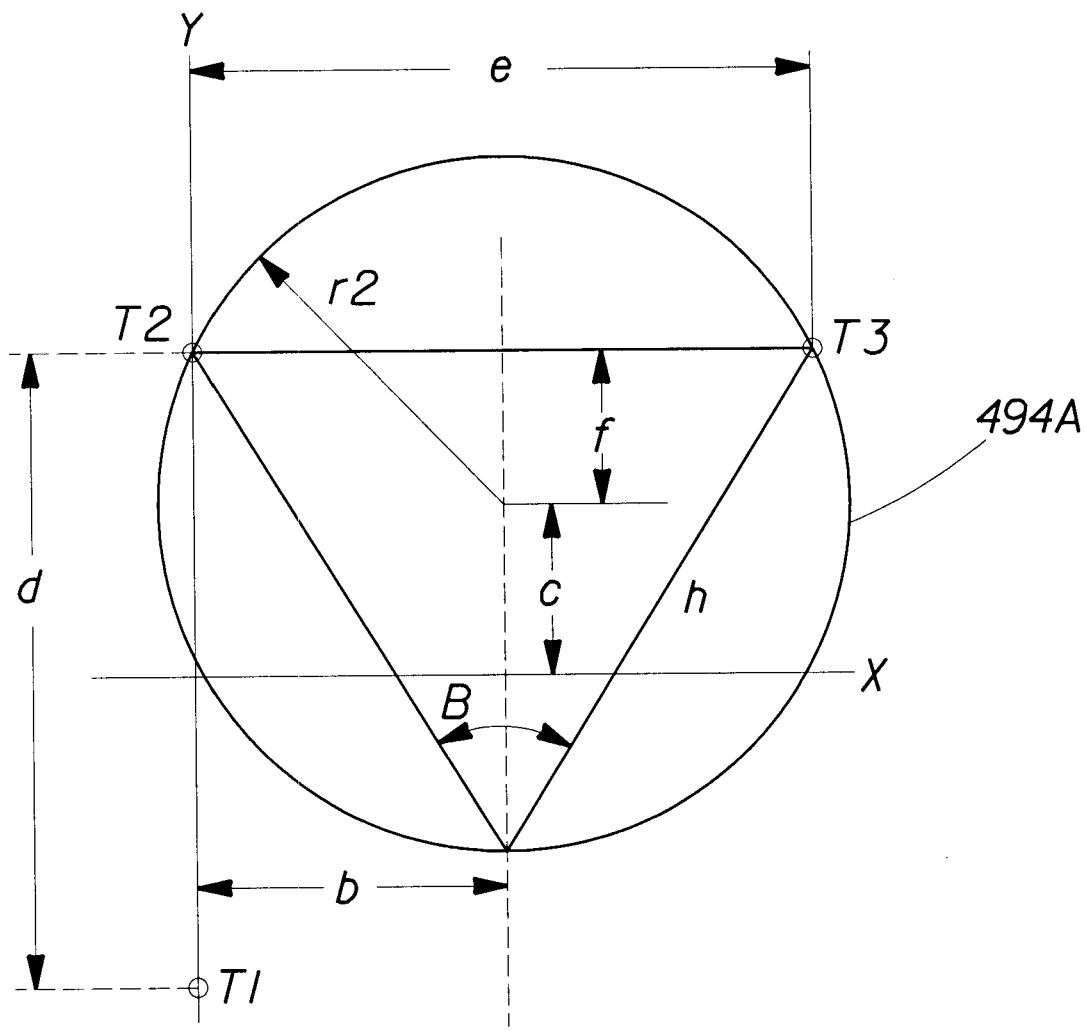
FIG. 14C shows a diagram of another circle defined by the angle B and the chord between transmitters T2 and T3, with the offsets b, c, and radius r2.

FIG. 14C shows circle 494A with its radius r2 and offsets b, and c. An equation 504 calculates radius r2. Equations 506 and 508 calculate offsets b and c, respectively, from angle B and distances d and e. Angle B is the angle measured by the directional loop antenna between transmitters T2 and T3. Distance d is the distance between transmitters T1 and T2. Distance e is the distance between transmitters T2 and T3.

Figure 15:
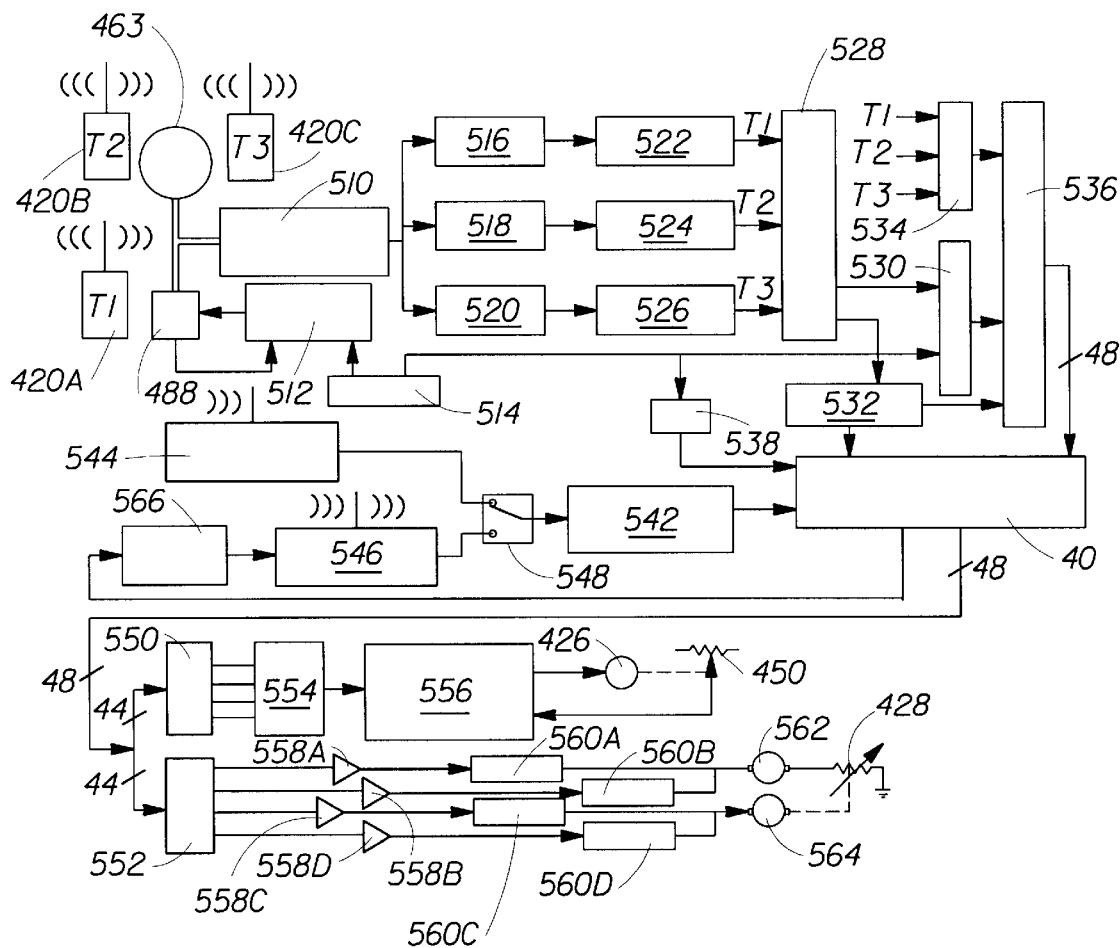
FIG. 15 shows a functional block diagram of that part of the control system of FIG. 12 located on the robot along with three continuous wave transmitters.

FIG. 15 is a functional block diagram illustrating the system operation in the present invention. The three continuous wave transmitters send a constant signal to directional loop antenna 436. The loop antenna is rotated at a constant speed by direct current motor 488. The speed of the motor is controlled by a phase locked loop 512. The phase locked loop receives input from light sensor 484. A clock 514 provides a reference frequency for the phase locked loop and a counter 130. The frequency of the clock input to counter 530 can be designed for about 4096 Hertz. The signal from the directional loop antenna is amplified by a radio frequency amplifier 510. The amplified signal is fed to filters 516, 518, and 520 tuned to each one of the continuous wave transmitters. The T1 filter is tuned to the frequency of transmitter 420A. Likewise the T2 filter is tuned to the frequency of transmitter 420B, and the T3 filter is tuned to the frequency of transmitter 420C. The outputs of each of these filters are fed into signal conditioners 522, 524, and 526 respectively. Functions of these signal conditioners will be described in more detail in FIG. 16. These signal conditioners feed a sequencer 128 which operates to assure that the proper sequence of pulses control counter 530 and a load pulse generator 532. Circuit description of the sequencer is provided in more detail in FIG. 17.

The pulses generated by the signal conditioners are also held in a latch 534. The information in the counter and latch are selected by a multiplexer 536 for input into a universal asynchronous receiver transmitter, UART 540. Load control signals for the UART are provided by the load pulse generator and a divide-by-N circuit 538. The serial output of the UART drives a modulator 566, which modulates a transceiver 546. This transceiver then transmits and receives signals from remote transceiver interface 432 of FIG. 12. All the transceivers used for data communication in this invention may be of the type used in cordless telephones commonly used in the industry. Thus any of the commercial cordless telephones will suffice. An audio coupler, not shown, may be used to make connection to the microphone input of the cordless handset. An alternate transceiver is the Micro-T transceiver manufactured by Adcon Telemetry of Boca Raton, Fla.

A manual control receiver 544 receives signals from hand-held programmer transmitter 422. Selector switch 548 is used to select the programming signal in the program mode, or the automated signal in the automatic mode of operation. A pulse shaper/conditioner 542 conditions the signal for serial input to UART 540. The serial data is converted to parallel data in UART 540 and is provided to a steering latch 550 and a drive latch 552. Data in latch 550 is converted to analog form by a D/A converter 554. The analog signal then feeds into a power driver and comparator 556, which controls steering motor 426. Feedback to comparator 556 is provided by a potentiometer 450, which is mechanically connected to the cross arm as previously described. This feedback provides for proportional control of steering motor 426. Data in latch 552 are buffered by drivers 558A, B, C, and D to relays 560A, B, C, and D respectively. Relays 560A and B connect power to drive motor 562. Relays 560C and D connect power to a speed control motor 564. Motor 564 mechanically turns a rheostat 428, which controls the current through drive motor 562 to control speed of movement.

Figure 16:
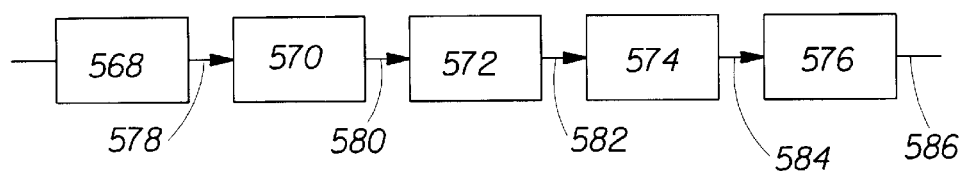
FIG. 16 shows the functional blocks associated with signal detection and pulse generation of the system in FIG. 12.

FIG. 16 shows the functional blocks within signal conditioners 522, 524, and 526 of FIG. 15. These conditioners are analog circuits commonly used in the industry and are available from National Semiconductor Corp., Santa Clara, Calif. They consist of an envelope detector 568, an inverter 570, a differentiator 572, a zero crossing detector 574, and a pulse generator 576.

Figure 17:
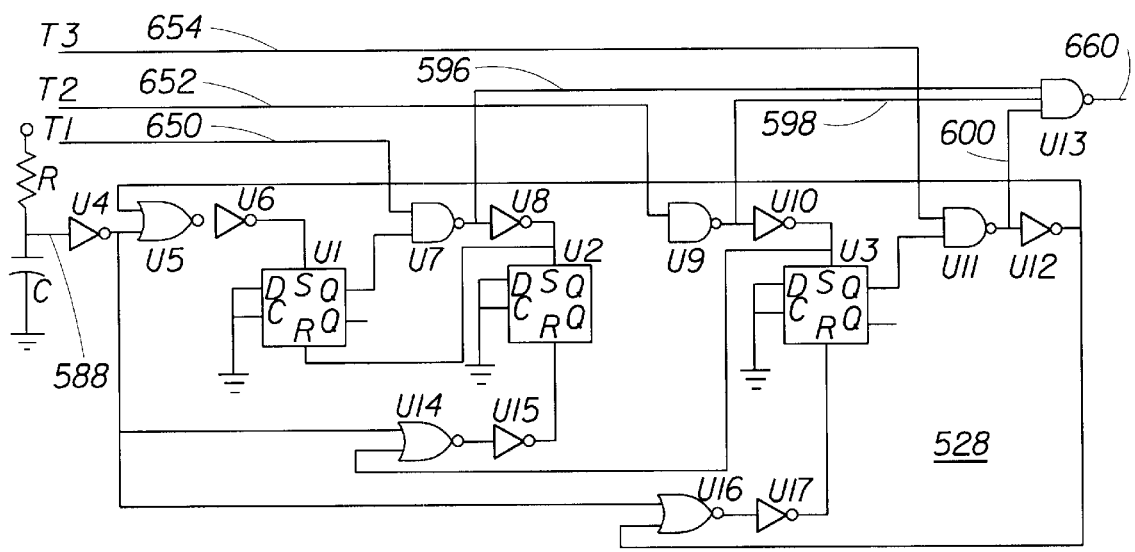
FIG. 17 is a schematic diagram of the sequencer of the control system in FIG. 12.

FIG. 17 shows a detailed circuit diagram of a sequencer 528. Operation of this circuit serves to allow only the proper sequence of pulses T1, T2, and T3 to be latched and read. This is required because of the symmetrical nature of the antenna pattern of the directional loop antenna. In certain locations of the cutting area, the order of reception of signals from the continuous wave transmitters may be backwards. The function of sequencer 528 is to allow only a forward sequence to assure the correct clock count and thus the correct angles between the transmitters. The sequencer is composed preferably of CMOS logic, and functions as follows. D flip flops U1, U2, and U3 are initialized to a 1,0,0 state upon power-up. A power-on reset 588 is produced by resistor R and capacitor C. Power-on reset is inverted by inverter U4 producing a momentary logic 1 output from U4. A logic 1 input to one of the inputs of NOR gate U5, U14, and U16 produce a logic 0 input to inverters U6, U15, and U17. The outputs of these inverters are logic 1 which sets flip flop U1 to logic 1, and resets flip flops U2 and U3 to logic 0. The sequencer is now initialized.

In this state only a T1 pulse 650 from signal conditioner 522 of FIG. 15 will change its state. When the T1 pulse comes in, it feeds through NAND gate U7 producing a logic 0 pulse to the input of inverter U8. The output of inverter U8 is a logic 1 pulse which sets flip flop U2 to logic 1, and resets flip flop U1 to logic 0. The output of NAND gate U7, a sequencer signal 596, is fed into an input of NAND gate U13. Since the other inputs to U13 are logic 1, the output of U13, a sequencer output 660, is a logic 1 pulse. Any other input before this point would not produce a sequencer output pulse nor would it change the state of the flip flops.

After the T1 pulse, the state of flip flops U1, U2, and U3 is 0,1,0. The output of flip flop U2 is a logic 1. The state of U1 is logic 0 which prevents the T1 pulse from getting through NAND gate U11. The logic 1 state of flip flop U2 does allow a T2 pulse 252 to get through NAND gate U9 to produce a logic 0 pulse, a sequencer signal 598. Signal 598 is transmitted through NAND gate U13 to produce a logic 1 pulse on sequencer signal 660. Signal 598 is inverted by inverter U10 to produce a logic 1 pulse which sets flip flop U3 to logic 1 and resets flip flop U2 via NOR gate U14 and inverter U15. After the T2 pulse, the state of flip flops U1, U2, and U3 is 0,0,1.

In this state U1 and U2 are logic 0 which prevents the T1 pulse from getting through NAND gate U7. Likewise the T2 pulse is prevented from getting through NAND gate U9. Only a T3 pulse 654 is allowed to get through NAND gate U11 to produce a logic 0 pulse on a sequencer signal 600. Signal 600 is transmitted through NAND gate U13 to produce a logic 1 pulse on sequencer signal 660. Signal 600 is also inverted by inverter U12 to produce a logic 1 pulse which sets flip flop U1 to logic 1 via NOR gate U5 and inverter U6. The logic 1 pulse output of inverter U12 also resets flip flop U3 to 0 via NOR gate U16 and inverter U17. After the T3 pulse, the state of flip flops U1, U2, and U3 is returned back to the original state of 1,0,0. The process repeats that operation. Whether the input order of pulses is forward, T1, T2, and T3, or in reverse, T3, T2, and T1, the output of the sequencer, signal 660 is always in the forward order, T1, T2 and T3.

Another mapping input commonly used in military guidance systems is the electronic compass. The compass input, like that from the other means described, is used to create a map by storing directional data as the platform is manually led through the desired path.

Another process of use is that the robot is placed in learning mode by temporarily closing a sensor contact (push button) or by infrared (IR) or radio frequency (transmitted) remote command or by voice command. In this mode sensor input is encoded in timed increments and stored in memory by the microprocessor. The home cleaning robot is manually pushed through the desired path by the user or directed remotely with a remote control device. During this learning period the output of the drive wheel motor and application specific sensors are recorded to read-write memory by the CPU optionally along with the output of the electronic compass thereby making a record of wheel revolutions, application events, and a record of direction during the task during successive time periods. At this point the home cleaning robot is said to be trained and the activity mapped. The end of the training may be input by manual sensor input (e. g. releasing a push button) or by reaching a sensed goal such as light level, radio frequency source (or reflector) IR source (or reflector) or some other activation means. Subsequently, the toy may be placed back at the starting point and placed in "playback mode" manually wherein the CPU recalls the stored encoder and direction data to control the motors (e. g. controls drive motors to reproduce same encoder timing and count) while comparing time and direction data during movement.

In the event of an obstacle in the path, the control system may become adaptive in that when obstacles are sensed by contact switches, sonar, or light, it will perform programmed record backing and turning avoidance movements and direction around the obstacle and record the deviation so as to store a vector from the point of obstruction in the map and then calculate a new vector back to a resumption point along the obstructed path. It should be recognized that this is a general description and that variations may be embodied in the control system for application-specific circumstances without departing from this teaching.

It should be further recognized that training and adaptation could be mixed. For example if the user grasps the home cleaning robot during operation and manually moves with the teaching mode engaged, the new motion would be recorded and inserted as part of the trained activity so as to allow piece-meal training. In this way a user may edit a task may by simple manual demonstration.

Once tasks are learned software may be additionally be provided for communication and storage of a task to a storage means such as a floppy disc, memory stick, a computer, or a like home cleaning robot by a hardwired connection or wireless communication. Optionally a platform may be provided with enough memory and an interface to allow storage and replay of plural trainings. In this manner a single home cleaning robot can be trained to perform a number of different tasks.

In a first embodiment, the platform is provided with a low energy cleaning implement. One embodiment of a low energy cleaning implement is a nonwoven electrostatic, cloth cover, such as the Swiffer® electrostatic cleaning clothes available from Procter & Gamble Company, Cincinnati Ohio. The cover is provided with cut outs on the under side to allow the wheels, or tracks to make contact with surface on which the home cleaning robot is operated. The underside of the platform may be further equipped with a foam pad or pad(s) to insure that the cover is brought in compliant contact with the underlying surface. The covers may connected to the platform in a variety of ways, including but not limited to wherein the cover is removably adhesively attached, wherein a frictional grip is used to attach the covers, wherein a mechanical engagement is used to attach the covers to this platform.

In an alternative embodiment, the low energy cleaning implement is a nonwoven wet cloth impregnated with a cleaning solution, such as the Swiffer® cleaning clothes available from Procter & Gamble Company, Cincinnati Ohio.

In a further embodiment of the present invention, the cover used is provided with the appearance of a bunny rabbit with large ears that act to dust base boards. The may also have a an adaptive behavior mode where it avoids light thus allowing it to be placed under furniture where it will dust and acting very much like a small nocturnal animal.

The method of use in one embodiment is to train the home cleaning robot by switching it into training mode and manually moving it over the surface to be cleaned. At the completion of the cleaning task training mode is switched off. Subsequently, the now-trained home cleaning robot set in play-ack mode can repeat the cleaning motions it was manually led through. In this embodiment contact sensors or proximity sensors on the outward facing edge of the platform provide for adaptive navigation so that the task may be completed even if obstacles subsequently are placed in the path.

In the second embodiment, the platform is provided with an electric spray pump and a fluid tank or container. Preferably the container is filled with a cleaning or deodorizing fluid that is benign to humans. The platform is to be additionally equipped with a disposable towel or a removable towel wiping means affixed to the underside of the home cleaning robot so as to have compliant contact with the underlying surface such as over a foam material. The spraying feature is controlled by a momentary contact switch (push button) mounted flush with the surface of the cover. The method of use is to train and then to subsequently operate. It is to be understood that if the home cleaning robot encounters obstacles near spray points it will not spray at those points.

In a third embodiment the home cleaning robot may be provided with a wax or polish impregnated pad or towel attached to the underside and having complaint contact with surface by means of a foam support. Alternatively a polish or wax may be dispensed onto the surface by an electric spraying pump, in which case the pad or towel would not necessarily be impregnated with a wax or polish. It is to be understood that a wide range of polishes, oils, or waxes might be provided depending on the nature of the surface to be polished or waxed. The methods of use follows the pattern of training and then adaptive operation as previously described.

In a fourth embodiment the home cleaning robot is applied to weed killing. In this embodiment the platform is preferably provided with driven tracks rather than wheels and may be further provided with a solar recharging means for recharging the power cell such an cover having a amorphous silicon solar cell (film) on its upper surface. The home cleaning robot is further equipped with a digital imaging means. The platform in this instance is provided with a sealed cartridge from which a safe herbicide may be dispensed or alternatively equipped with a magnifying glass means of concentrating solar energy on suspect weeds and safely destroying them by heating. One or more passive radio frequency (PRF) tags are provided to be implanted in lawn areas where weed killing is to take place. The home cleaning robot is provided with a (PRF) tag exciting transmitter and a receiver for detecting resonating tags.

The method of operation of the fourth embodiment requires training to the extent that the home cleaning robot is placed over typical weed types and typical grass and the images are recorded. Subsequently the home cleaning robot is moved a radial distance away from the PRF homing tag that will define an approximate limit. The home cleaning robot is then placed in operative mode wherein it spirally moves in toward the PRF tag scanning for weed image patterns and releasing spray or focusing sunlight onto the offending weeds when they are found.

In the fifth embodiment the platform is equipped with a digital RF transmitter and receiver and PRF homing tags with separate resonant frequencies are used to tag articles which may be misplaced. An LCD window and keypad may also be provided with the platform for manual I/O.

The method of operation of the fifth embodiment requires that PRF tags are placed on articles that may be misplaced such as purses, keys, wallets, clothing, and the like. During training the name of each tagged article is encoded into the home cleaning robot after being presented to it in training mode. The home cleaning robot is further trained by manually leading it through a general search path. In operation it will travel that path and alarm when it is in close proximity to a PRF tag selected from a menu of learned tags. It should be recognized that the use of learned RF tags permits games of hide and seek, competitive searching, and many other play activities.

In the sixth embodiment, the platform is provided with an air filter or an activated carbon air purifying means, or both. The method of operation is to train the home cleaning robot to follow a path through a room or multiple rooms thus purifying and/or cleaning air over a wider area than would be possible with a stationary filter or air purifier. The platform may additionally be provided with a sensor that detects smoke or gases and which provides an alarm of unsafe conditions. Such sensing technology is readily available from a wide range of sources including any Walmart.

In the seventh embodiment, the platform is provided with an odor detecting sensor means and a means of spraying an odor reducing substance. One such substance is cyclodextrin in water. Various odor reducing fluids suitable for use are available from Procter and Gamble Company, Cincinnati, Ohio. The home cleaning robot in this case is trained to "patrol" a path. It's path programming is overridden when strong odors are detected and it moves along the gradient of increasing intensity.

In an $8^{th}$ embodiment the platform is provided with a means of dispensing aromatic sprays such as, but not limited to, essential oils and perfumes. The method of use is training the home cleaning robot to follow a path with positions where it is trained to dispense aromatic sprays. The dispensing means can consist of a fan blowing over an cartridge with an odor dispensing wick, a spraying means, or an atomizing means such as an oscillating membrane. The platform may optionally be provided with plural aromatic or odor producing means so as to produce different odors at different locations.

In a $9^{th}$ embodiment the platform is provided with an infrared (IR) or sonar detection means in order to act a security measure. It is trained to "patrol" a path or to travel to different locations at different times, and provides an alarm in the event motion is detected. A wide range of motion detection electronics are available from Radio Shack stores.

In 10$^{th}$ embodiment the platform is provided with a vacuuming means. In this embodiment the vacuuming means may be supplemented by drawing the vacuum through an electrostatic cloth, such as the Swiffer product available from Procter & Gamble, Cincinnati, Ohio. Alternatively a conventional brush a vacuum arrangement may be used. It is trained to vacuum as desired. Such a home cleaning robot may be programmed to avoid light so that it preferentially stays and vacuums under furniture where full-sized vacuum cleaners do not reach and dust and pet hair collect.

In an 11$^{th}$ embodiment the platform is provided with a means of cutting or killing grass such as a string, hot wire, spray, or solar heat concentrating magnifying glass and trained to follow the edges of walkways and driveways and the like cutting or destroying over-growing vegetation.

In a 12$^{th}$ embodiment, the platform is provided with a suction means such as a vacuum (a reverse of a skirted air cushion levitation means) so that it is held on a wall or other non-horizontal surface and provided with a dusting means such as an electrostatic cleaning cloth or dust mop. Again the home cleaning robot is trained to follow a particular path. In this instance a remote means of training guidance is preferred.

In a 13$^{th}$ embodiment a floating platform is provided with a propulsion means such as a flexible fish-tail, paddling feet, or the like wherein the extremities or tail have a lightly abrasive cover. This platform may further be equipped with a soap dispensing or deodorizing means. It is employed by the child as bath home cleaning robot and acts to clean the bathtub after use. This platform would be primarily trained and guided by electronic compass. In a variation, without the abrasive cover, it could be placed in laundry tub to agitate the laundry and dispense detergent.

In a 14$^{th}$ embodiment a tracked platform or one with high-traction wheels is provided with a pushing means (this might have the appearance of a animalistic bulldozer). The home cleaning robot is trained to patrol a path and when encountering obstacles, push them away from the path or to a particular location. This home cleaning robot would be of particular value to a teenager.

In a 15$^{th}$ embodiment a tracked platform, or one with high-traction wheels is provided with a blade or equipped with a means of dispensing salt or other ice melting substances. It is trained to patrol a walkway or driveway and remove snow or dispense ice melting substances. The platform would optionally have a solar charging means and a flashing light means such as an LED for use in the dark after training. The home cleaning robot would optionally have a remote guidance control so that the child could remain in a warm house and guide the home cleaning robot outside. The same home cleaning robot can also be trained by the child to dispense fertilizer or seed in the spring and summer.

In a 16$^{th}$ embodiment a larger platform is used capable of supporting a garbage can or optionally being a wheeled can. The platform would optionally be provided with a solar recharging means. The child would train the "garbage can" by wheeling it from its storage position to a garbage pick-up position on an appropriate schedule. The can might optionally be provided with odor reducing means whereby it would spray the contents periodically with an odor reducing fluid or sterilizing fluid.

In a 17$^{th}$ embodiment the home cleaning robot is equipped with a video camera and is trained to patrol a path. The platform is provided with a wireless Internet interface so that the images can be remotely accessed. Its play value is manifold.

In an 18$^{th}$ embodiment the home cleaning robot is provided with some and gas detection means and is trained to patrol a path. It is further provided with a means of dispensing a fire-retardant substance. The platform is further provided with IR sensors. If, on its trained path, the IR sensors detect emissions at combustion temperatures, the home cleaning robot will dispense the fire retardant substance via a pump and nozzle.

In a 19$^{th}$ embodiment the home cleaning robot is provided with a track or wheels having permanent magnetic surfaces or sub-surfaces. The home cleaning robot is further provided with an electrostatic cloth. The home cleaning robot is trained to follow paths on ferromagnetic surfaces such as automobiles or appliances.

In a 20$^{th}$ embodiment the home cleaning robot is provided with a near-field motion detecting means. Such a means may include, but is not limited to, a photodiode-photoreceptor pair, sonar, or tactile contacts such as fine optical fibers wherein motion of the fiber changes light transmission properties. The home cleaning robot is trained to patrol a path where insects are suspected or present. The home cleaning robot may dispense water, an insect repellant, or emit ultrasound to rid the locale of insects.

In a 21$^{st}$ embodiment the platform is provided with tracks or wheels having velcro-like micro-hooks (or velcro). The platform is further provided with a cleaning means such as a dusting cloth, cleaning fluid, or vacuum or some combination. It is trained along paths that involve highly irregular, cloth surfaces such a furniture or bedcovers.

In a 22$^{nd}$ embodiment, the platform is provided with a metal detecting means. Such means are readily available from a wide range of suppliers. The home cleaning robot is equipped with a compass navigation means and a triangulating beacon means and trained by locating at perimeter points. (It does not have to manually moved along the perimeter.) In operation it covers the area within the perimeter and can be used to search for lost jewelry, coins, keys, and the like. It can also be used to prospect for various "treasures" to be found in parks and the like.

In a 23$^{rd}$ embodiment, a small platform is provided with a soft, pliant tracks. The method of use is to train the home cleaning robot to travel on a human back delivering a back rub.

Other and similar non-enumerated embodiments are similarly possible as will now become apparent by combining a platform with a similar task-enabling means and a cover and personality consistent with the task behavior. They include:

In yet another embodiment the present invention is comprised of an autonomous, trainable, adaptive mobile home cleaning robot provided with a means of receiving signals from sensors carried on or in living organisms to monitor temperature, blood pressure, pulse rate, motion, perspiration, or odors or some combination thereof.

In yet another embodiment the present invention is comprised of an autonomous, trainable, adaptive mobile home cleaning robot provided with a means of detecting the direction and intensity of sound at pre-determined frequency ranges. Such a home cleaning robot can be used to detect abnormal noise in the home such as a water leak, a faulty motor, or an alarm. It will also can give the appearance of listening and moving toward a pers on speaking.

In yet another embodiment the present invention is comprised of an autonomous, trainable, adaptive mobile home cleaning robot provided with a means of receiving and broadcasting sound so as to simulate various acoustic phenomena such as moving sound sources or time-separated sound sources such as spatially displaced instruments in an orchestra or band. Such a home cleaning robot can be used in lieu of stationary loudspeakers.

In yet another embodiment the present invention is comprised of an autonomous, trainable, adaptive mobile home cleaning robot provided with a means of magnetic attachment and an electrostatic cloth whereby the home cleaning robot can dust ferromagnetic surfaces such as automobiles and appliances.

In yet another embodiment the present invention is comprised of an autonomous, trainable, adaptive mobile home cleaning robot provided with a means of attachment to a smooth surface such as a vacuum between the home cleaning robot and surface or by means of an aerodynamic force, whereon said home cleaning robot can perform some function to the surface. An example would we a window cleaning or mirror cleaning home cleaning robot.

In yet another embodiment the present invention is comprised of an autonomous, trainable, adaptive mobile home cleaning robot provided with a means of walking locomotion and a dirt or dust collecting capability so as to be able to gather dirt and dust from irregular surfaces such as the interior of an automobile or stairs.

In yet another embodiment the present invention is comprised of an autonomous, trainable, adaptive mobile home cleaning robot provided with a means propulsion under water. Said home cleaning robot may optionally record or transmit sound or images.

In yet another embodiment the present invention is comprised of an autonomous, trainable, adaptive mobile home cleaning robot provided with a lighter than air means of flying and provided with sound and video recording or transmitting means.

In yet another embodiment the present invention is comprised of an autonomous, trainable, adaptive mobile home cleaning robot provided with a means of detecting higher energy radiation (such as microwave, x-ray, or nuclear) and traveling toward such radiation or alarming if such radiation exceeds predetermined thresholds.

In yet another embodiment the present invention is comprised of an autonomous, trainable, adaptive mobile home cleaning robot provided with a means detecting raised or inverted folds of cloth on a flat surface such as an ironing board and stretching them flat. Generally this may be done a platform with a pair of wheels additional to the driving wheel pair. The home cleaning robot, detecting the fold by simple optical means (e.g. diode photodetector pair), positions itself over the fold with a pair of wheels on each side at which time each pair of wheels is caused to turn opposing one another.

In yet another embodiment the present invention is comprised of an autonomous, trainable, adaptive mobile home cleaning robot provided with a means traversing rain gutters on roofs and removing leaves and other debris from the gutter. In this instance a tracked platform may be used and the platform is to be optionally provided with a solar recharging means. The debris or leaves are removed by a one arm scoop wherein the scoop, lifted, may be rotated around the arm to dump the scooped debris over the edge of the gutter.

In yet another embodiment the present invention is comprised of an autonomous, trainable, adaptive mobile home cleaning robot provided with a means delivering paint to surfaces. The home cleaning robot is used by training to cover a typical area shape and size and then operated to cover wider and wider areas.

In yet another embodiment the present invention is comprised of an autonomous, trainable, adaptive mobile home cleaning robot provided with a means of delivering chemistries or radiation to reduce mildew, moss, and other growth on the roofs of buildings, said robot being waterproof and provided with a solar power generating means.

In yet another embodiment the present invention is comprised of an autonomous, trainable, adaptive mobile home cleaning robot provided with a means of detecting ground moisture and selectively delivering water to arid areas of gardens near flowers and other shrubbery.

In yet another embodiment the present invention is comprised of an autonomous, trainable, adaptive mobile home cleaning robot provided with a means of detecting pet feces on lawns and kennel floors and gathering said feces by means of a one-armed scoop where the scoop is capable of rotating around the arm.

In yet another embodiment the present invention is comprised of an autonomous, trainable, adaptive mobile home cleaning robot is provided with a soft plastic or rubber surface and a rapid, but intermittent propulsion means so to act as artificial prey for cats, dogs, or children with hunting instincts (in lieu of small animals).

In yet another embodiment the present invention is comprised of an autonomous, trainable, adaptive mobile home cleaning robot provided with a means of cellular communication such as a cellular phone capable for remote mobile acoustic monitoring.

In yet another embodiment the present invention is comprised of an autonomous, trainable, adaptive mobile home cleaning robot provided with a means of cleaning or sterilizing food serving areas such as tables with depressed surfaces for food in lieu of dishes.

In yet another embodiment the present invention is comprised of an autonomous, trainable, adaptive mobile home cleaning robot provided with a tracked means of propulsion so as to traverse fields, woods, and the like. Said home cleaning robot to be provided with photosensitive areas which when illuminated by a laser strike provide for an acoustic or motional response so as to provide a non-lethal outdoor hunting experience where harmless laser pens or pointers used as "weapons".

In yet another embodiment the present invention is comprised of an autonomous, trainable, adaptive mobile home cleaning robot provided with a grinding or mulching means for use in reducing the volume of garbage or trash in a container.

In yet another embodiment the present invention is comprised of an autonomous, trainable, adaptive mobile home cleaning robot provided with a paint or dye spraying means to prepare banners, flags, and paintings.

In yet another embodiment the present invention is comprised of an autonomous, trainable, adaptive home cleaning robot provided with a powder spraying means to prepare sports playing areas for various games such as hopscotch, soccer, and the like.

In yet another embodiment the present invention is comprised of an autonomous, trainable, adaptive mobile home cleaning robot provided with a means of recording it motions in a form or format that can be transferred to a full sized appliance or vehicle. For example, but not limited to, a home cleaning robot lawnmower that can be run over the lawn, not cutting, wherein its recorded path can be subsequently downloaded to a robotic lawn mower with hazardous blades that could not be used by a child.

Although particular versions and embodiments of the present invention have been shown and described, various modifications can be made to these home cleaning robots without departing from the teachings of the present invention. The terms used in describing the invention are used in their descriptive sense and not as terms of limitation, it being intended that all equivalents thereof be included within the scope of the claims.

What is claimed is:

1. An autonomously, movable home cleaning robot comprising:
   a) a platform;
   b) a motive force attached to said platform, said motive force to autonomously move said platform on a substantially horizontal surface having boundaries;
   c) a computer processing unit for storing, receiving and transmitting data, said computer processing unit attached to said platform;
   d) a cleaning implement operatively associated with said platform; and
   e) a power source connected to said motive force and said computer processing unit, whereby said computer processing unit directs horizontal movement of said platform within the boundaries of the horizontal surface based upon input data defining said boundaries, said input data being input to said robot by physical manipulation of said robot or by remote control.

2. An autonomously, movable cleaning robot comprising:
   a) a platform;
   b) a motive force attached to said platform, said motive force to autonomously move said platform on a substantially horizontal surface having boundaries;
   c) a computer processing unit for storing, receiving and transmitting data, said computer processing unit attached to said platform;
   d) at least one sensor attached to said platform and capable of detecting an obstacle on the horizontal surface, said sensor providing input to said computer processing unit;
   e) a cleaning implement operatively associated with said platform; and
   f) a power source connected to said motive force and said computer processing unit, whereby said computer processing unit directs horizontal movement of said platform within the boundaries of the horizontal surface based upon input data received by physical manipulation of said robot or by remote control, wherein said input data are useful for manipulating said robot through a desired task.

3. A home cleaning robot according to claim 2, wherein said sensor interrupts said motion when said sensor senses an obstacle.

4. A autonomously, movable home cleaning robot comprising:
   a) a platform;
   b) a motive force attached to said platform, said motive force to autonomously move said platform on a substantially horizontal surface having boundaries;
   c) a navigation system including a computer processing unit for receiving, storing and transmitting data, said navigation system receiving input about an environment that includes the horizontal surface and using the input to map said horizontal surface;
   d) a cleaning implement operatively associated with said platform; and
   e) a power source connected to said motive force and said navigation system, whereby said navigation system directs the movements of said platform in accordance with the map of said horizontal surface, said navigation system comprising a triangulation system including three fixed transmitters located within the environment, said computer processing unit using signals received from said transmitters to calculate a coordinate position of said robot within the boundaries of the surface, and generating a control signal to steer said robot in the direction of the next point of said stored coordinate system.

5. A home cleaning robot according to claim 4, wherein said navigation system includes a receiver for receiving input from the environment, said receiver sending input to said computer processing unit, whereby said computer processing unit using the input to map the horizontal surface.

6. A home cleaning robot according to claim 5, wherein said navigation system including a visual image processor and a camera attached to said robot, said system determining said robot's orientation and position on the surface based upon an image of a ceiling above the surface, said system then generates control signals to steer said robot within the boundaries of the surface.

7. A home cleaning robot according to claim 5, wherein said navigation system includes a position identification apparatus that senses a distance traveled by said robot and a change in a direction of travel of said robot, said navigation system calculates a position of said robot in two-dimensional coordinates in response to the sensed distance and the sensed change in direction, and generates a position signal representative of said robot position.

8. A home cleaning robot according to claims 1, 3 or 5, further comprising a cover removably attached to said platform.

9. A home cleaning robot according to claims 1, 3 or 5, further comprising a ball support.

* * * * *